United States Patent
Ninomiya

(10) Patent No.: US 10,019,164 B2
(45) Date of Patent: Jul. 10, 2018

(54) PARALLEL COMPUTER, MIGRATION PROGRAM AND MIGRATION METHOD

(71) Applicant: FUJITSU LIMITED, Kawasaki-shi, Kanagawa (JP)

(72) Inventor: Atsushi Ninomiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 15/143,654

(22) Filed: May 2, 2016

(65) Prior Publication Data
US 2016/0357442 A1    Dec. 8, 2016

(30) Foreign Application Priority Data
Jun. 3, 2015 (JP) .................................. 2015-113164

(51) Int. Cl.
*G06F 12/00* (2006.01)
*G06F 3/06* (2006.01)
(Continued)

(52) U.S. Cl.
CPC .......... *G06F 3/0605* (2013.01); *G06F 3/0647* (2013.01); *G06F 3/0673* (2013.01);
(Continued)

(58) Field of Classification Search
CPC .... G06F 3/0605; G06F 3/0647; G06F 3/0673; G06F 3/485; G06F 12/0813;
(Continued)

(56) References Cited

U.S. PATENT DOCUMENTS 5,185,861 A * 2/1993 Valencia ............... G06F 9/5033
710/52
6,654,859 B2 * 11/2003 Wooldridge ........ G06F 12/0813
711/147
(Continued)

FOREIGN PATENT DOCUMENTS

EP    0557050 A1    8/1993
EP    0965918 A2    12/1999
(Continued)

OTHER PUBLICATIONS

Ribeiro, Christiane Pousa, et al. "Memory affinity for hierarchical shared memory multiprocessors." Computer Architecture and High Performance Computing, 2009. SBAC-PAD'09. 21st International Symposium on. IEEE, 2009.*

(Continued)

*Primary Examiner* — David Yi
*Assistant Examiner* — Francisco A Grullon
(74) *Attorney, Agent, or Firm* — Fujitsu Patent Center

(57) ABSTRACT

A parallel computer includes a first node and a second node, each including a memory having a plurality of memory areas and a cache memory, and a processing unit that acquires a first group of index levels of the cache memory, the first group of index levels corresponding with addresses of first plurality of memory areas storing data accessed by a job in the first node, when continuing an execution of the job by migrating the job carried out on the first node to the second node, judges whether or not the second node has second plurality of memory areas that are a usable state corresponding to a second group of index levels that has same as or relative position relation with the first group of index levels, and relocates the data to the second plurality of memory areas when the second node has the second plurality of memory areas.

20 Claims, 35 Drawing Sheets

(51) Int. Cl.
*G06F 12/0813* (2016.01)
*G06F 9/48* (2006.01)
*G06F 12/0815* (2016.01)
*G06F 12/084* (2016.01)
*G06F 12/0842* (2016.01)

(52) U.S. Cl.
CPC ............ *G06F 9/485* (2013.01); *G06F 12/084* (2013.01); *G06F 12/0813* (2013.01); *G06F 12/0815* (2013.01); *G06F 12/0842* (2013.01); *G06F 2212/1024* (2013.01); *G06F 2212/2542* (2013.01); *G06F 2212/62* (2013.01)

(58) Field of Classification Search
CPC ............ G06F 12/0815; G06F 12/084; G06F 12/0842; G06F 2212/1024; G06F 2212/2542; G06F 2212/62
See application file for complete search history.

(56) References Cited

U.S. PATENT DOCUMENTS

| | | | |
|---|---|---|---|
| 8,566,547 B2* | 10/2013 | Montgomery | G06F 3/0617 711/154 |
| 8,930,947 B1* | 1/2015 | Derbeko | G06F 9/45558 711/113 |
| 9,792,062 B2* | 10/2017 | Kruglick | G06F 3/0622 |
| 2002/0129115 A1* | 9/2002 | Noordergraaf | G06F 12/0813 709/213 |
| 2008/0168237 A1 | 7/2008 | Shen et al. | |
| 2011/0173622 A1 | 7/2011 | Shin et al. | |
| 2013/0290971 A1* | 10/2013 | Chen | G06F 9/46 718/102 |

FOREIGN PATENT DOCUMENTS

| | | |
|---|---|---|
| EP | 2657841 A1 | 10/2013 |
| JP | 08-77068 | 3/1996 |
| JP | 10-207850 | 8/1998 |
| JP | 2000-066899 | 3/2000 |
| JP | 2009-087139 | 4/2009 |

OTHER PUBLICATIONS

Extended European Search Report dated Aug. 1, 2016 for corresponding European Patent Application No. 16170797.1, 11 pages.

* cited by examiner

| | Number of CPU cores | Number of memory pages | NUMA policy |
|---|---|---|---|
| Job A | 4 | 4 | BIND |
| Job B | 4 | 4 | BIND |
| Job C | 2 | 4 | INTERLEAVE |
| Job D | 2 | 4 | INTERLEAVE |
| Job E | 4 | 4 | INTERLEAVE |

FIG. 5

| H1 | t1 | t2 | t3 | t4 | t5 | t6 | t7 |
|---|---|---|---|---|---|---|---|
| NODE nd1 | A | A | / | C! | C!、D! | C!、D! | C!、D! |
| NODE nd2 | / | B | B | B | B | / | E! |

| | t1 | t2 | t3 | t4 | t5 | t6 | t7 |
|---|---|---|---|---|---|---|---|
| NODE nd1 | A | A | / | C! | C!, D! | C!, D! | C!, D! |
| NODE nd2 | / | B | B | B | B | / | E! |

→

H2

| | t1 | t2 | t3 | t4 | t5 | t6 | t7 |
|---|---|---|---|---|---|---|---|
| NODE nd1 | A | A | / | C! | C!, D! | C1, D1 | C1, D1, E1 |
| NODE nd2 | / | B | B | B | B | C2, D2 | C2, D2, E2 |

| Index level | Number of memory pages | List of memory page |
|---|---|---|
| 0 | 2 | p(i, 0)  p(i, K) |
| 1 | 1 | p(i, 1) |
| 2 | 0 | |
| 3 | 1 | p(i, 3) |
| ... | | |
| K-1 | 0 | |

| Index level | State of memory page | Number of memory pages | List of memory page |
|---|---|---|---|
| 0 | Non-use | 0 | — |
| | Used (caching use of the file) | 0 | — |
| | Used (not used recently) | 0 | — |
| | Used state (used recently) | 2 | p(i, 0)  p(i, K) |
| 1 | Non-use | 1 | p(i, 2K+1) |
| | Used (caching use of the file) | 0 | — |
| | Used (not used recently) | 0 | — |
| | Used state (used recently) | 1 | p(i, 1) |
| ... | ... | ... | ... |
| K-1 | Non-use | 0 | — |
| | Used (caching use of the file) | 0 | — |
| | Used (not used recently) | 1 | p(i, 5K-1) |
| | Used state (used recently) | 1 | p(i, K-1) |

PARALLEL COMPUTER, MIGRATION PROGRAM AND MIGRATION METHOD

CROSS-REFERENCE TO RELATED APPLICATION

This application is based upon and claims the benefit of priority of the prior Japanese Patent Application No. 2015-113164, filed on Jun. 3, 2015, the entire contents of which are incorporated herein by reference.

FIELD

The embodiments discussed herein are related to a parallel computer, a migration program, and a migration method.

BACKGROUND

There is an information processing device including a plurality of CPU (Central Processing Unit) cores and memories. An OS (Operating System) of such an information processing device and software operating on the OS, when performing a migration of a job under the execution, relocates hardware resources (CPU core and memory) which are assigned to the job.

The software (below called as relocation program) relocates the CPU core by changing the CPU core which carries out the process of the job operating. In addition, the relocation program relocates the memory by changing the memory area where the data, of which the process of the job under the execution accesses, are stored.

On the other hand, a cache memory in the information processing device has data array including a plurality of data in unit which is called as cache line and tag array (also called as cache tag) having the information of corresponding cache line depending on an index level. The CPU core judges a cache miss-hit of the memory area for the access target with reference to the cache tag based on the index level.

In addition, among the cache memory, there is a cache memory to determine the cache line which stores the data of the memory area based on the address of the memory area for the access. According to such cache memory, the CPU core acquires the index level based on the address of the memory area for the access.

Patent documents 1-4 disclose the technique about the cache memory.

[Patent document 1] Japanese Laid-open Patent Publication No. 2009-87139

[Patent document 2] Japanese Laid-open Patent Publication No. 2000-66899

[Patent document 3] Japanese Laid-open Patent Publication No. H8-77068

[Patent document 4] Japanese Laid-open Patent Publication No. H10-207850

SUMMARY

When the relocation program relocates the memory area where the data accessed by the process of the job under the execution were memorized, the address of the memory area for the access changes. With the change of the address, a cache line memorizing the data of the memory area may change.

When the job under the execution accesses the plurality of memory areas, with the change of the address, the cache line memorizing the data of plurality of memory areas may overlap. By the overlap of the cache line, the rewrite for the same cache line frequently occurs during the execution of the job, thereby the slashing of the cache memory may occur. By the outbreak of the slashing, latency of the processing time of the memory access increases, therefore the execute time of the job gets longer.

According to an aspect of the embodiments, a parallel computer includes a first node and a second node, each including a memory having a plurality of memory areas; and a cache memory, and a processing unit that acquires a first group of index levels of the cache memory in the first node, the first group of index levels corresponding with addresses of first plurality of memory areas that store data accessed by a job in the first node, when continuing an execution of the job by migrating the job that carried out on the first node to the second node, judges whether or not the second node has second plurality of memory areas that are a usable state corresponding to a second group of index levels that has same as or relative position relation with the first group of index levels that is acquired, and relocates the data to the second plurality of memory areas when the second node has the second plurality of memory areas.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram explaining the NUMA policy about job resources required by the job A-job E and the memory "mm" appointed to the job A-job E.

FIG. 5 is a diagram illustrating an allocation state of memory pages mp for the job A-job E when the relocation is not performed in chronological order (timing t1-t7).

FIG. 7 is a diagram illustrating an allocation state of memory pages mp for the job A-the job E when the relocation is performed in chronological order (timing t1-t7).

FIG. 26 is a diagram explaining an example of job use memory information 122 according to the second embodiment depicted by FIG. 24 and FIG. 25.

FIG. 27 is a diagram explaining an example of memory use state information 124 depicted by FIG. 24 and FIG. 25.

DESCRIPTION OF EMBODIMENTS

Embodiments will be described hereinafter according to the drawings. However, it is noted that the technical scope is not limited to the embodiments described below, but covers the matters described in the claims and the equivalents thereof.

[Information Processing Device]

Figure 1:
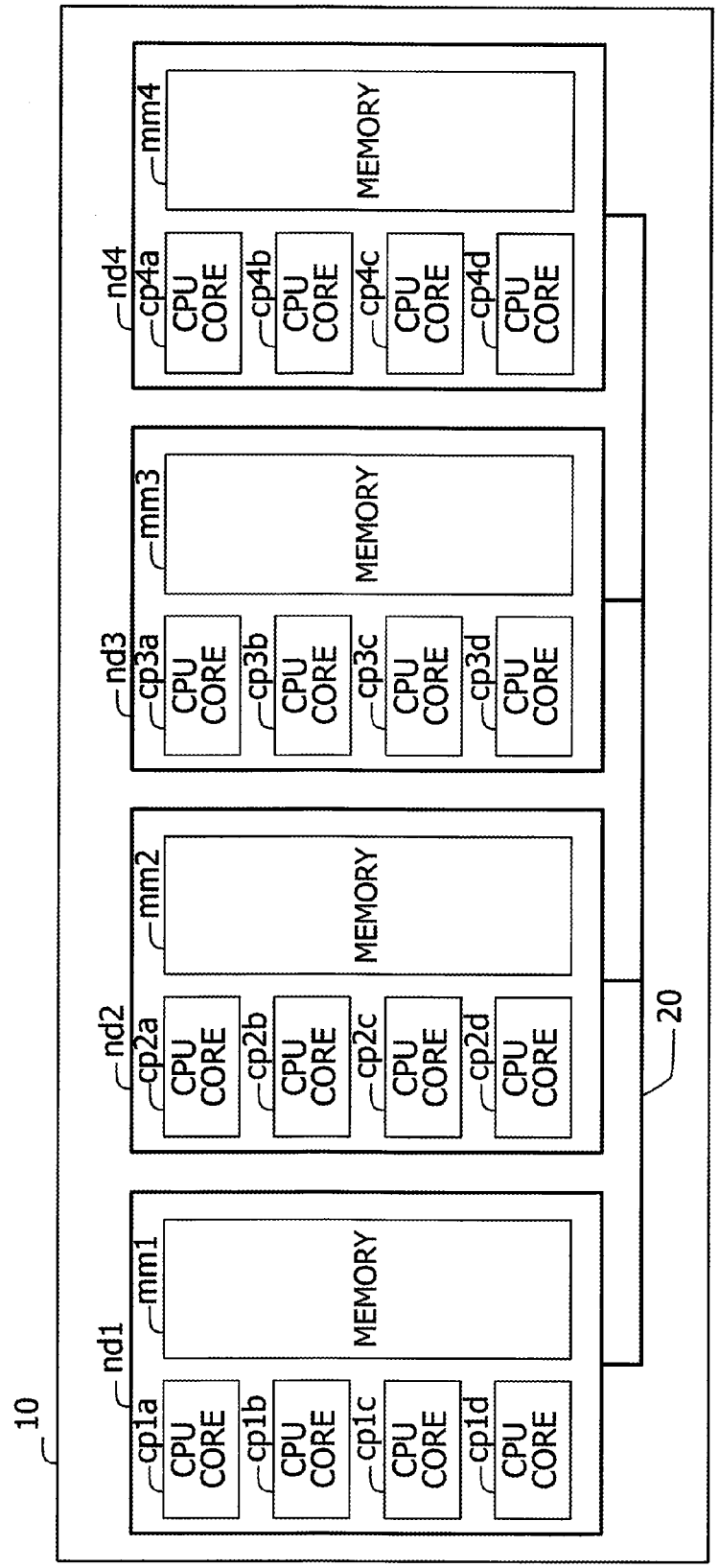
FIG. 1 is a diagram explaining an example of the information processing device in the embodiment.

FIG. 1 is a diagram explaining an example of the information processing device in the embodiment. In FIG. 1, the information processing device 10 is an information processing device 10 adopting NUMA (Non-Uniform Memory Access) architecture.

In FIG. 1, the information processing device 10 has a plurality of building blocks "nd1"-"nd4". Each of the building blocks "nd1"-"nd4" is called as a node as follows. A plurality of nodes "nd1"-"nd4" (also called as a node "nd") is connected through an inter-connect 20 of high speed such as a global crossbar switch and a LAN (Local Area Network) mutually. In addition, the number of node "nd" included in the information processing device 10 is not a thing limited to an example of FIG. 1.

Each of nodes "nd" has a plurality of CPU cores "cp1a"-"cp4d" (also called as a CPU core "cp") and a plurality of memories "mm1"-"mm4" (also called as a memory "mm"). The details of the hardware constitution of each node "nd" are described later according to FIG. 13. FIG. 1 illustrates an example of the case that each node "nd" has the CPU core "cp" and the memory "mm" to simplify the explanation. In addition, the number of CPU core "cp" and the number of the memory "mm" included in each node "nd" is not a thing limited to an example of FIG. 1. In addition, each of the memory "mm" has a plurality of memory areas which is not illustrated in FIG. 1.

Each node "nd" (for example, the node "nd1") accesses the memory mm1 (called as the local memory) included in the node "nd" and the memories mm2-mm4 (called as the remote memory) included in other node "nd" (for example, the nodes "nd2"-"nd4"). In other words, each node "nd" shares the memory "mm" each other. In addition, the access for the remote memories "mm2"-"mm4" by a certain node "nd" (for example, the node "nd1") is slow for the access for the local memory "mm1" by a certain node "nd".

In FIG. 1, the information processing device 10 carries out a plurality of jobs. The job is constructed by one or more processes and is the process group which executes single process with collaboration. In addition, for example, the job is an execution unit of application program.

The operation system (not illustrated in FIG. 1) operating with the information processing device 10 carries out the job by allocating the job resources (the CPU core "cp", the memory "mm") required by a target job. In other words, the operation system carries out the job by allocating the number of CPU core "cp" and the number of the memory area required by the job to the job. For example, the information processing device 10 performing HPC (high performance computing) uses single CPU core "cp" for the execution of the process.

[Allocation of Job Resources]

Figure 2:
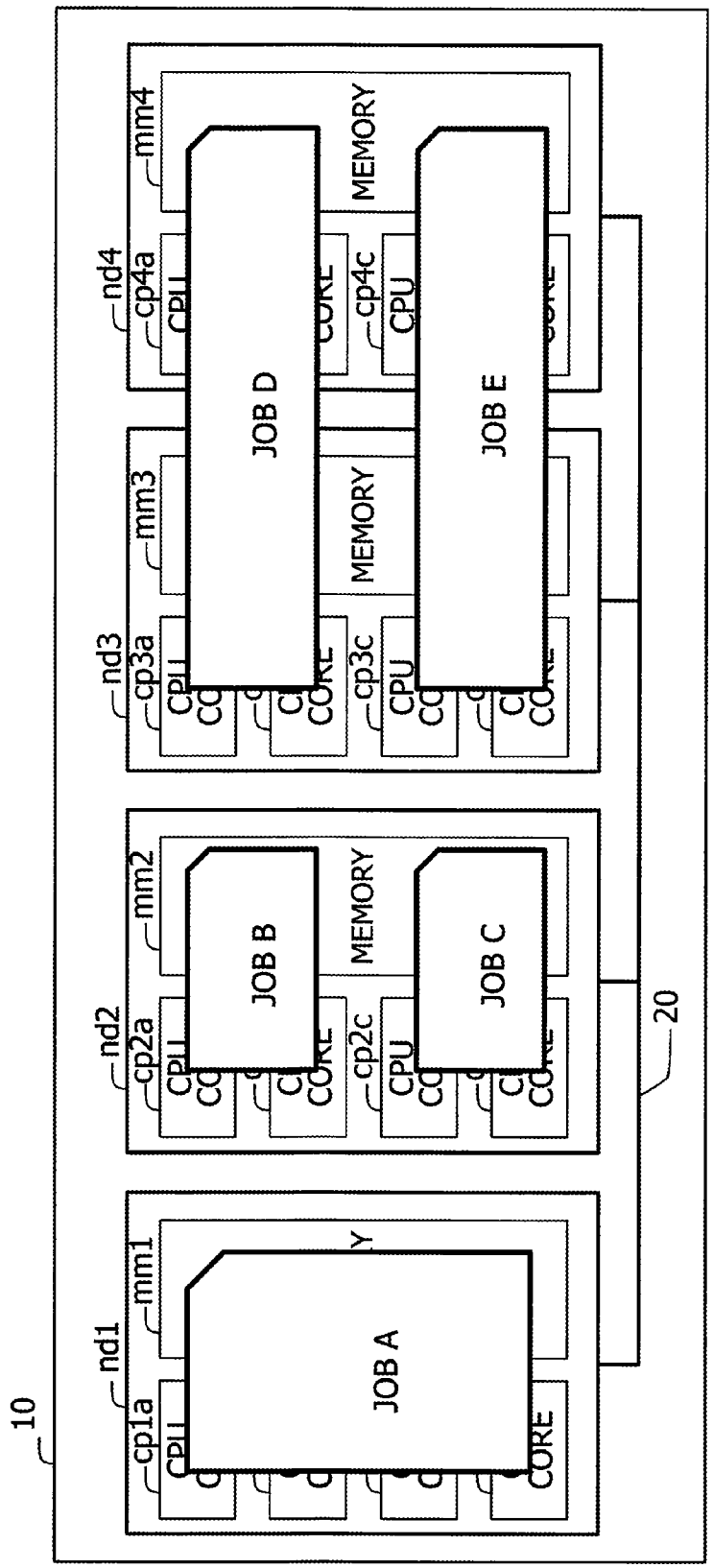
FIG. 2 is a diagram explaining the allocation of the job resources for the job schematically.

FIG. 2 is a diagram explaining the allocation of the job resources for the job schematically. FIG. 2 illustrates an example of the case that the information processing device 10 depicted by FIG. 1 carries out five jobs (job A-job E).

As illustrated in FIG. 2, the node "nd1" and node "nd2" carry out one job (job A) or plural jobs (job B, job C). The job A occupies, for example, four CPU core "cp1a"-"cp1d" of the node "nd1" and the memory "mm1" of the node "nd1" and carries out processing. On the other hand, the job B carries out processing using two CPU core "cp2a", "cp2b" of the node "nd2" and the memory "mm2" of the node "nd2". The job C is similar to the job B, too.

In addition, the node "nd3" and node "nd4" collaborate and carry out the job (job D, job E). The job D carries out processing using two CPU core "cp3a", "cp3b" of node "nd3" and two CPU core "cp4a", "cp4b" of the node "nd4" and the memories "mm3" and "mm4" of nodes "nd3" and "nd4". The job E is similar to the job D, too.

As described above, the information processing device 10 depicted by FIG. 1 adopts the NUMA architecture. Therefore, the operation system of information processing device 10 allocates the job resources to each job based on the NUMA policy designated by the job. Then, the NUMA policy will be described.

[NUMA Policy]

NUMA policy is a set value appointing the allocation method of job resources. The user appoints the NUMA policy by appointing API (Application Programming Interface) of the NUMA architecture that the operating system provides for the program corresponding the job. For example, the user appoints the NUMA policy for a job depending on the characteristic of processing of job contents.

Here, an example of NUMA policy about the designation of the allocation of CPU core "cp" and the NUMA policy about the designation of the allocation of memory "mm" will be described.

The NUMA policy about the designation of the allocation of CPU core "cp" has a policy "PACK", a policy "UNPACK" and a policy "CPUBIND=X" for example. The policy "PACK" indicates designation to allocate the process of the job to the CPU core "cp" of single node "nd". The policy "UNPACK" indicates designation to allocate the process of the job to the CPU core "cp" of plural nodes "nd". The policy "CPUBIND=X" indicates designation to allocate the process of the job to the CPU core "cp" of node "nd" of the X number.

The NUMA policy about the designation of the allocation of memory "mm" has a policy "LOCAL", a policy "BIND=X", a policy "PREFER=X" and a policy "INTERLEAVE" for example.

The policy "LOCAL" indicates designation to allocate the memory "mm" memorizing the data accessed by the process of the job to the memory "mm" of node "nd" where the CPU core "cp" which works a process belongs to. The policy "BIND=X" indicates designation to forcibly allocate the memory "mm" to the memory "mm" of the node "nd" of the X number. The policy "PREFER=X" indicates designation to allocate the memory "mm" to as much as possible from the memory "mm" in the node "nd" of the X number. The policy "INTERLEAVE" indicates designation to allocate to the memory mm of each node "nd" according to round-robin system.

In this way, the job may have designation of the NUMA policy. However, when allocating the job resources to require to the job, a case that the NUMA policy of the job is not satisfied occurs. Therefore, the operating system performs migration of the job under the execution so that a job under the execution satisfies the NUMA policy, and relocates the job resources of which the job concerned has used.

Or the operation system performs the migration of the job under the execution in order to use job resources of each node "nd" more effectively, and relocates the job resources of which the job concerned has used.

[Relocation of Job Resources]

The operation system relocates the CPU core "cp" by changing the CPU core "cp" which carries out the process of the job to different CPU core "cp". Or the operation system relocates the memory mm by changing the memory area where the data accessed by the process of the job accesses were memorized to another memory area.

Then, according to FIG. 3-FIG. 9, an example of the relocation of the job resources of which the running job uses will be described. FIG. 3-FIG. 9 illustrates an example of the case that two node "nd1", "nd2" carry out five jobs (job A-job E). At first, according to FIG. 4-FIG. 6, an allocation example of job resources when the allocation is not performed will be described. Next, according to FIG. 7-FIG. 9, an allocation example of job resources when the relocation is performed will be described. Below, the plural memory areas included in the memory "mm" are called as memory page.

FIG. 3 is a diagram explaining the NUMA policy about job resources required by the job A-job E and the memory "mm" appointed to the job A-job E. According to a table HJ in FIG. 3, the job A, job B and job E require four CPU core "cp" and four memory pages for the execution of the job. In addition, the job C and job D require two CPU core "cp" and two memory pages for the execution of the job.

In addition, the NUMA policy appointed in the job A, job B is policy "BIND" (that is, to assign memory pages to use from the memory pages of node "nd" under the execution the job). In addition, the NUMA policy appointed in the job C-job E is policy "INTERLEAVE" (that is, to assign memory pages to use to the memory pages of each node "nd").

(A Case of not Performing of Relocation)

Figure 4:
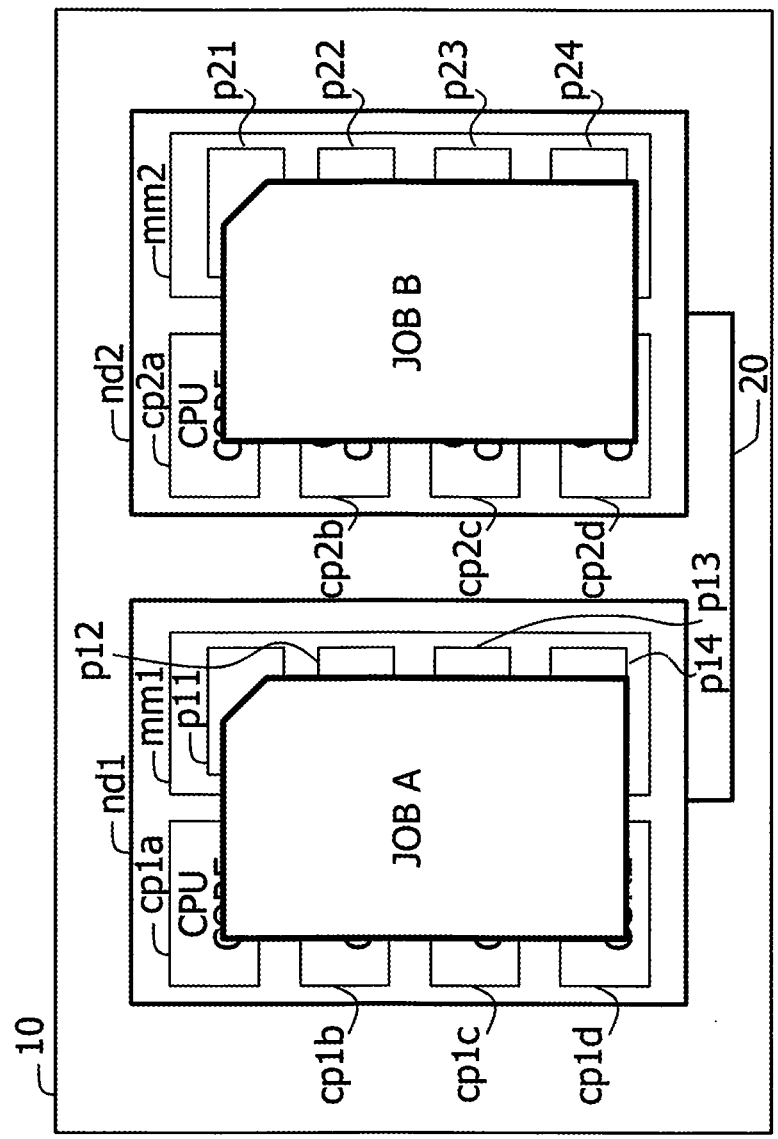
FIG. 4 is a diagram explaining the allocation of job resources during execution of the relocation is not performed.

FIG. 4 is a diagram explaining the allocation of job resources during execution of the relocation is not performed. In FIG. 4, same elements as illustrated in FIG. 1 and FIG. 2 are represented by same sign. The operation system assigns the job resources to each job depending on the empty situation of job resources in order of the job A-the job E.

As described above in FIG. 1 and FIG. 2, each of nodes "nd1" and "nd2" in FIG. 4 have four CPU core "cp" (cp1a-cp1d, cp2a-cp2d). In addition, each of memory "mm" in each node "nd" has four memory pages p11-p14, p21-p24 (also called as memory pages "mp").

FIG. 4 illustrates an allocation state of job resources during execution of the job A and the job B run. The operation system allocates four CPU core "cp1a"-"cp1d" in the node "nd1" to the job A based on job resources (FIG. 3) required by the job A. In addition, the operation system allocates four memory pages p11-p14 in the node "nd1" based the on the policy "BIND" when allocating four memory pages mp to the job A.

Then, the operation system allocates four CPU core "cp2a"-"cp2d" in the node "nd2" to the job B based on job resources (FIG. 3) required by the job B. In addition, the operation system allocates four memory pages p21-p24 in the node "nd2" to the job B based on the policy "BIND". In this way, the operation system allocates the job resources required by the job to the job according to the NUMA policy.

FIG. 5 is a diagram illustrating an allocation state of memory pages mp for the job A-job E when the relocation is not performed in chronological order (timing t1-t7).

The operation system starts execution of the job C in a timing t4 in response to completion of the job A in a timing t2 and release of the job resources in the node according to a table H1 in FIG. 5. Because the job B occupies the job resources in the node "nd2", the operation system allocates two CPU core "cp" and two memory pages "mp" in the node "nd1" to the job C. In this case the job C does not satisfy the policy "INTERLEAVE" because the job C uses only memory pages mp in single node "nd1".

Then, the operation system allocates two CPU core "cp" and two memory pages "mp" in the node "nd1" to the job D in a timing t5. The job D also does not satisfy the policy "INTERLEAVE" because the job D uses only memory pages mp in single node "nd1".

And the operation system starts execution of the job E in a timing t7 in response to completion of the job B and release of the job resources in the node "nd2" in a timing t5. The operation system allocates four CPU core "cp" and four memory pages "mp" in the node "nd2" to the job E. However the job E also does not meet the policy "INTERLEAVE" because the job E uses only memory pages in single node "nd2".

A sign "!" depicted in the table H1 of FIG. 5 indicates that the job does not meet the NUMA policy. Accordingly, the table H1 in FIG. 5 includes the sign "!" indicating that the executions of the job C-the job E do not satisfy with the NUMA policy in a timing t4-t7.

Figure 6:
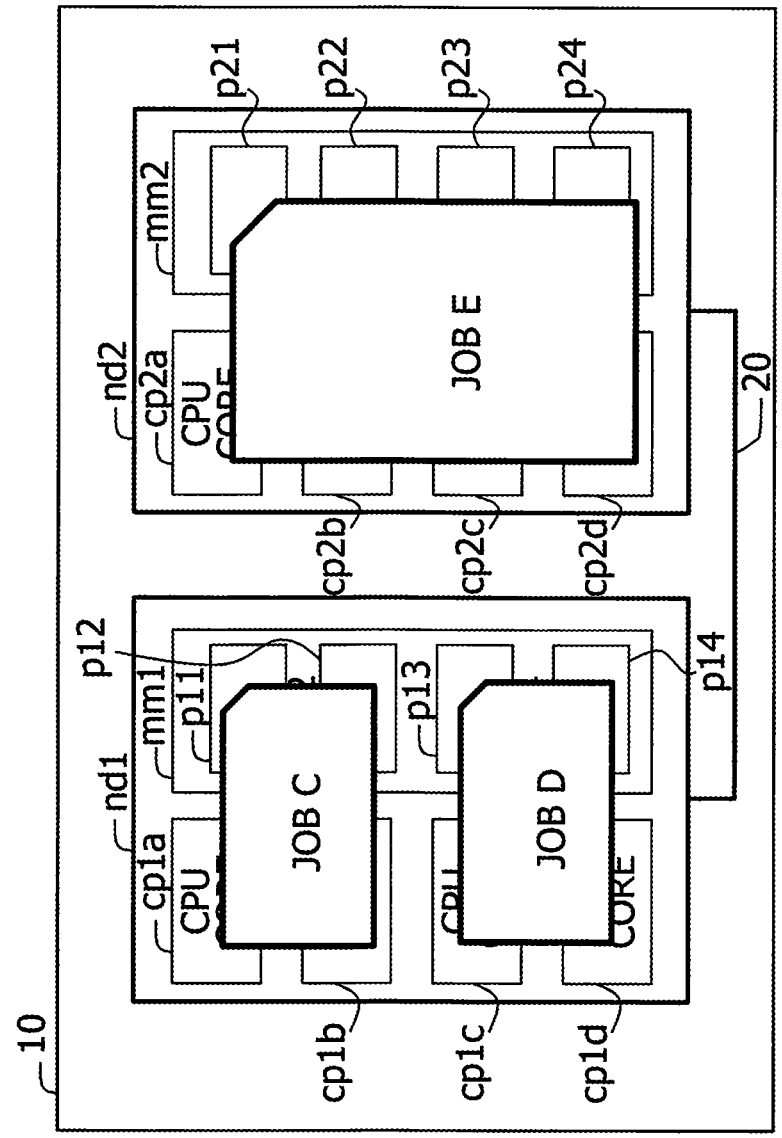
FIG. 6 is a diagram indicating the allocation state of job resources of the job C-the job E at a timing t7 depicted in FIG. 5.

FIG. 6 is a diagram indicating the allocation state of job resources of the job C-the job E at a timing t7 depicted in FIG. 5. In FIG. 6, same elements as illustrated in FIG. 1 and FIG. 2 are indicated by same sign.

As described above in FIG. 5, each of the job C and the job D uses two CPU core "cp" and two memory pages "mp" in the node "nd1" at a timing t7. In addition, the job E uses four CPU core "cp" and four memory pages "mp" in the node "nd2". In other words, each of the job C-the job E uses only memory pages mp in single node "nd".

(A Case of Performing the Relocation)

FIG. 7 is a diagram illustrating an allocation state of memory pages mp for the job A-the job E when the relocation is performed in chronological order (timing t1-t7). In FIG. 7, same elements as illustrated in FIG. 5 are represented by same sign. In addition, the table H1 in FIG. 7 is similar to the table H1 depicted by FIG. 5.

Table H2 of FIG. 7 illustrates an allocation state of memory pages "mp" when the relocation of the memory is performed at a timing t6. When the job resources in the node "nd2" are released, the operation system relocates the memory pages "mp" which the job C and the job D under the execution use into the memory pages "mp" in the node "nd1" and node "nd2" to satisfy with the NUMA policy in a timing t6.

In addition, each of two CPU core "cp" and two memory pages "mp" in the node "nd1" and node "nd2" become vacant condition in a timing t7. Therefore, the operation system allocates two CPU core "cp" and two memories page "mp" in each of the node "nd1" and node "nd2" to the job E to satisfy the NUMA policy.

Figure 8:
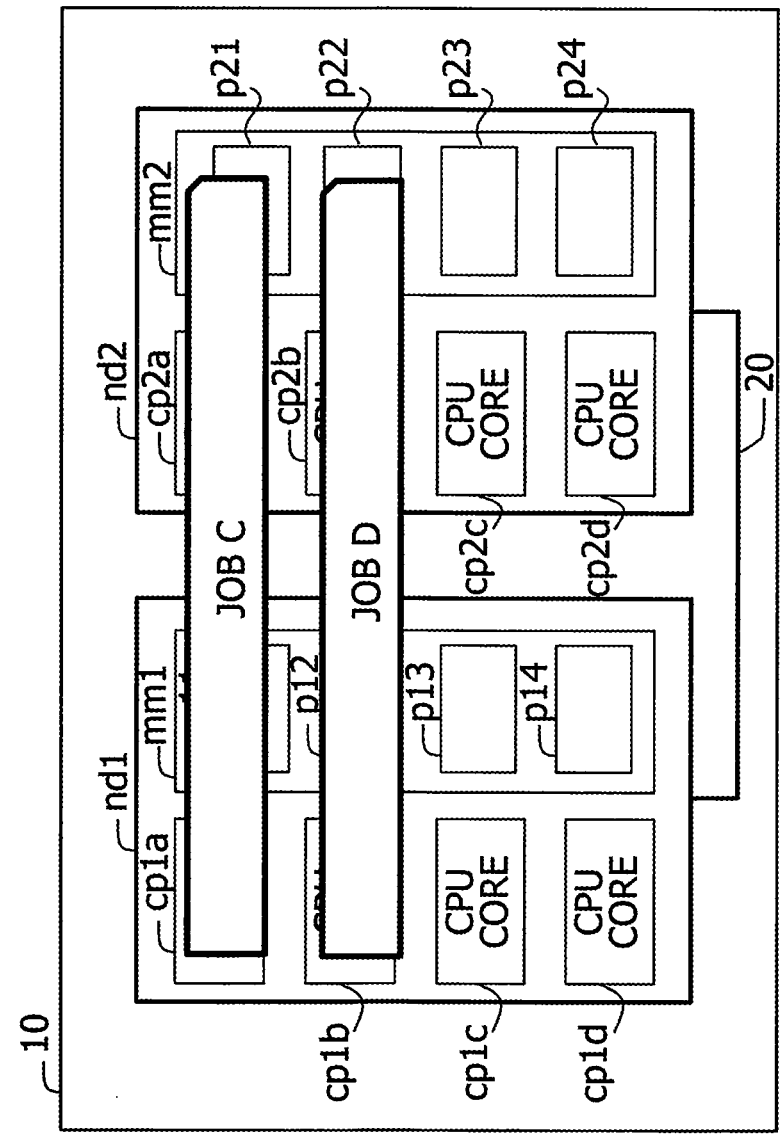
FIG. 8 is a diagram indicating the allocation state of job resources of the job C and the job D at a timing t6 depicted by FIG. 7.

FIG. 8 is a diagram indicating the allocation state of job resources of the job C and the job D at a timing t6 depicted by FIG. 7. In FIG. 8, same elements as illustrated in FIG. 5 are represented by same sign.

As described above in FIG. 7, each of the job C and the job D uses two CPU core "cp" and two memory pages "mp" in the node "nd1" and node "nd2" at a timing t6. In other words, each of the job C and the job D satisfies the policy "INTERLEAVE" because each of the job C and the job D uses memory pages "mp" in each of nodes "nd".

Figure 9:
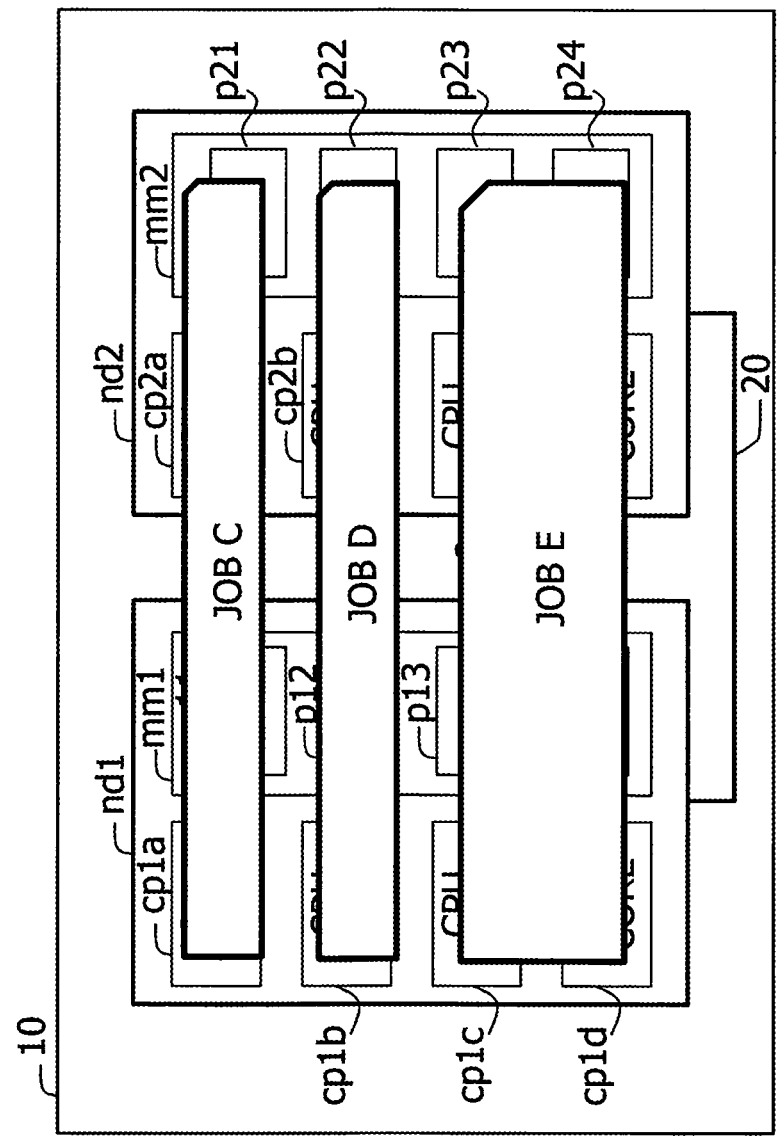
FIG. 9 is a diagram indicating the allocation state of job resources of the job C-the job E at a timing t7 depicted by FIG. 7.

FIG. 9 is a diagram indicating the allocation state of job resources of the job C-the job E at a timing t7 depicted by FIG. 7. In FIG. 9, same elements as illustrated in FIG. 5 are represented by same sign.

As described above in FIG. 7, each of the job C-the job E uses the memory pages "mp" in each of nodes "nd1" and "nd2" at a timing t7. Therefore, the job C-the job E satisfies the policy "INTERLEAVE".

As illustrated in FIG. 7-FIG. 9, according to the relocation of the memory pages mp which are already allocated to the job C and the job D under the execution, the job C-the job E satisfies the NUMA policy. When the operation system relocates the memory pages "mp", the operation system copies data memorized in the memory pages "mp" utilized by the job into the memory pages "mp" of the relocation destination and assigns the memory pages "mp" of the relocation destination to the job. Therefore, a physical addresses of memory pages "mp", which are accessed by the process of the job, change according to the relocation of memory pages "mp". In addition, in this case, the address of the virtual memory accessed by the process of the job does not change.

The CPU core "cp" in each of nodes "nd" accesses the memory pages "mp" through a cache memory. According to the relocation of memory pages "mp" depicted by FIG. 7-FIG. 9, physical addresses of memory pages "mp" where the process of the job accesses change. By the change of the physical addresses of memory pages "mp", the slashing in the cache memory may occur.

Then, according to FIG. 10, the constitution of the cache memory according to the embodiment will be explained. And the outbreak of the slashing in the cache memory which will be explained in FIG. 10 will be described according to FIG. 11.

[Constitution of Cache Memory]

Figure 10:
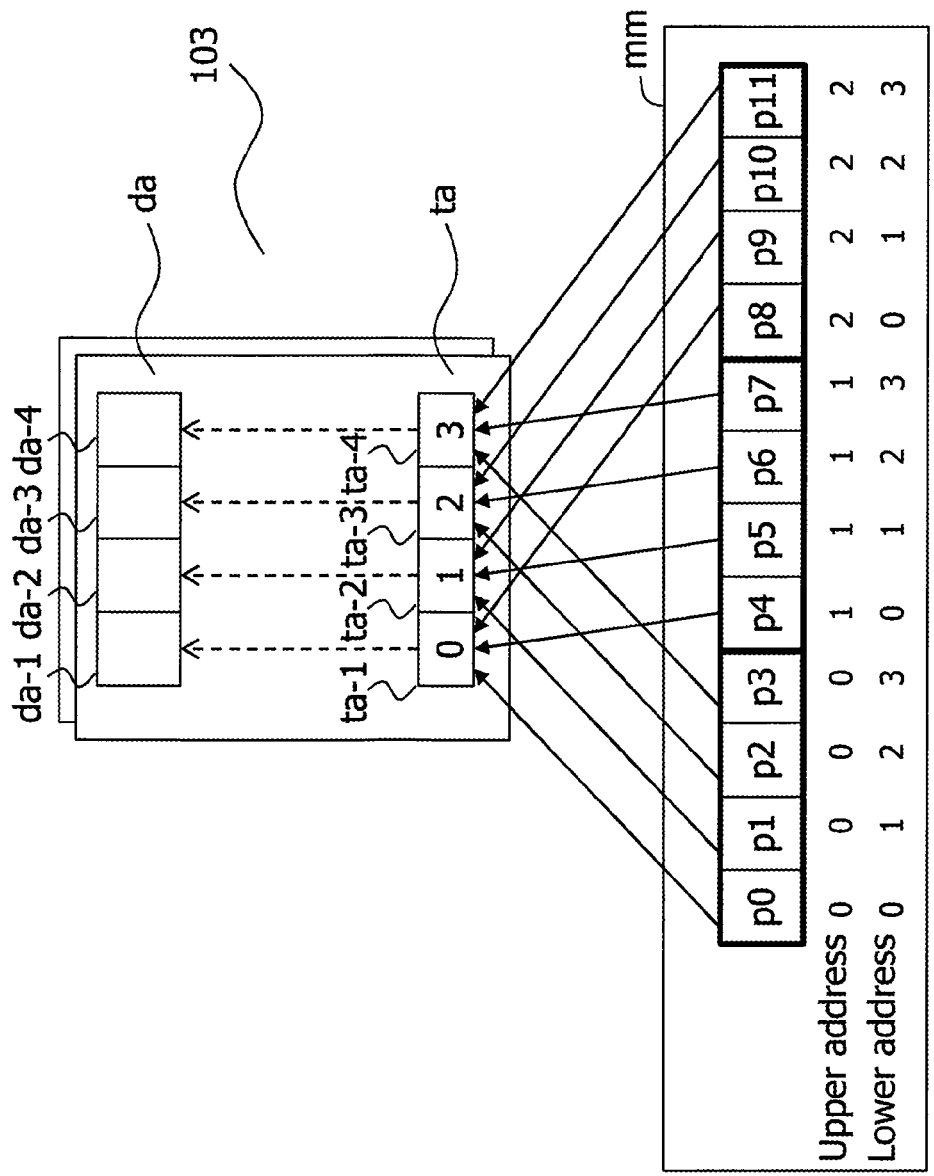
FIG. 10 is a diagram indicating an example of the constitution of cache memory 103 according to the embodiment.

FIG. 10 is a diagram indicating an example of the constitution of cache memory 103 according to the embodiment. FIG. 10 illustrates the cache memory 103 and the memory "mm" included in each of nodes "nd" represented by FIG. 1 and FIG. 2. The memory "mm" depicted by FIG. 10 has 12 memory pages p0-p11 (mp, memory area).

The cache memory 103 has tag array "ta" and data array "da". The data array "da" has a plurality of data regions (below called as cache line) da-1-da-4 of the predetermined size. The tag array (called as cache tag) "ta" has tags ta-1-ta-4 having information of corresponding cache line da-1-da-4 depending on the index level.

The tag "ta-1" of index level "0" corresponds the first cache line "da-1". Similarly, the tag "ta-2" of index level "1" corresponds the second cache line "da-2". It is similar about the tags "ta-3", "ta-4" of the other index level.

According to the cache memory 103 depicted by FIG. 10, a target cache line (that is, an index level) memorizing data which is stored in each memory pages p0-p11 is decided based on a physical address of the memory pages p0-p11. The cache memory 103 that index levels are decided based on physical addresses of the memory pages p0-p11 is called as a physical address cache.

The cache memory (Level 2, Level 3 cache, etc.) 103 having a big size to share between the processes often adopts physical address cache. An example of the method of the physical address cache includes a set associative method and a direct mapping method.

The cache memory 103 depicted by FIG. 10 represents the cache memory of the set associative method of 2 way/4 lines. Therefore, as illustrated in FIG. 10, the cache memory 103 has two sets of the tag array "ta" and data array "da" that the number of the array is four.

The CPU core "cp" acquires an index levels based on the physical address (top address) of the memory pages p0-p11 for the access. The CPU core "cp" refers corresponding cache tag "ta", performs a cache miss-hit test of the memory pages "mp" for the access based on the index levels For example, the CPU core "cp" calculates, as an index level, a surplus when an address is divided by a multiplication level of the number of the cache lines with the size of the cache line. In this embodiment, among the addresses "higher address+lower addresses of memory pages p0-p11," the lower address corresponds to the index level.

For example, according to the example of FIG. 10, the address of the memory page p0 is value "0/0" (higher address/lower address). The lower address "0" corresponds to the index level "0". Similarly, the address of the memory page p1 is value "0/1" and the lower address "1" corresponds to the index level "1". Similarly, the address of the memory page p2 is value "0/2" and the lower address "2" corresponds to the index level "2".

In addition, the address of the memory page p4 is value "1/0" and the lower address "0" corresponds to the index level "0". In this way, the memory pages p0, p4 where are the same a lower address correspond to same index level "0". In other words, the data of the memory pages p0, p4 are memorized in same cache line "da-1".

Each of tags "ta-1"-"ta-4" has the information such as higher address of the memory pages p0-p11 which are stored in corresponding cache line "da-1"-"da-4". The CPU core "cp" performs the cache miss-hit by comparing the higher addresses of memory pages p0-p11 for the access with the higher addresses included in the tags "ta-1"-"ta-4" of the index levels.

When the higher address matches with each other, the CPU core "cp" determines that data of memory pages p0-p11 for the access is stored in the cache memory 103 (cache hit). On the other hand, when the higher address does not match with, the CPU core "cp" determines that data of memory pages p0-p11 for the access is not stored in the cache memory 103 (cache-miss).

Then, according to FIG. 11A and FIG. 11B, the summary of the slashing in the cache memory 103 will be described. The slashing in the cache memory 103 indicates a phenomenon that the rewrite of data for same cache line da-1-da-4 depicted by FIG. 10 occurs frequently. When a plurality of memory pages p0-p11 where the job accesses corresponds with a same index level, during the execution of the job, the rewrite of data for cache line "da-1"-"da-4" concerned occurs frequently.

[Slashing in Cache Memory]

Figure 11A:
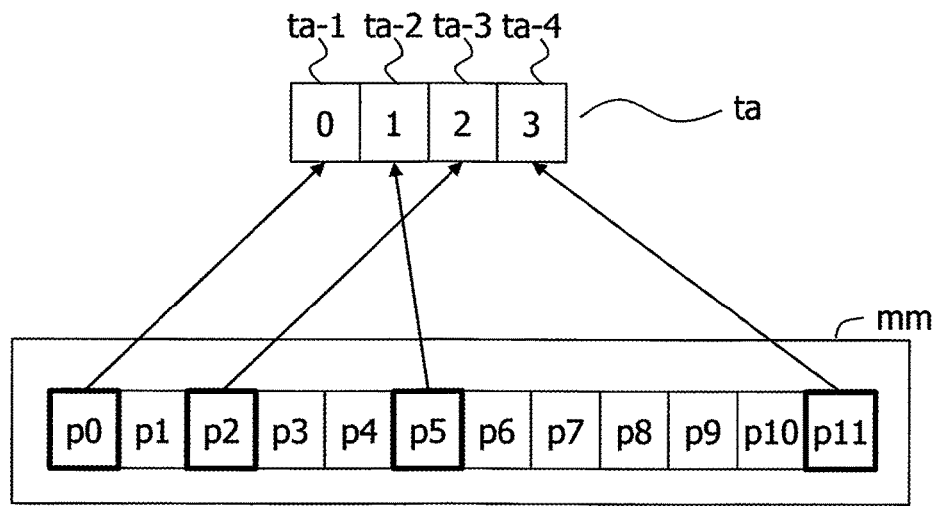
FIG. 11A and FIG. 11B are diagrams explaining the outbreak of the slashing with the relocation of the memory schematically.
Figure 11B:
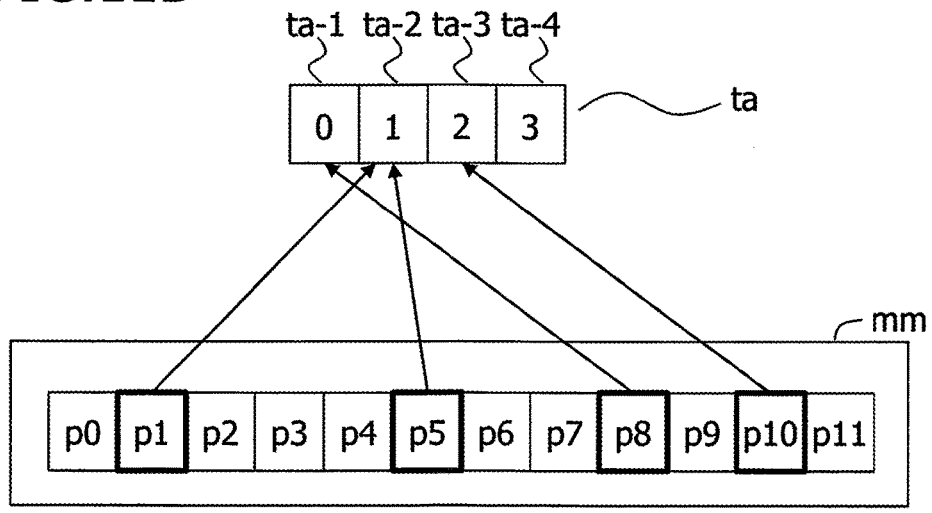

FIG. 11A and FIG. 11B are diagrams explaining the outbreak of the slashing with the relocation of the memory schematically. FIG. 11A illustrates a state before the relocation, and FIG. 11B illustrates a state after the relocation. In FIG. 11A and FIG. 11B, same elements as illustrated in FIG. 10 are represented by same sign. The cache memory 103 depicted by FIG. 11A and FIG. 11B represents an excerpt of the tag array "ta" and memory "mm" of the cache memory 103 illustrated in FIG. 10.

According to the example of FIG. 11A, a certain job uses (accesses) a plurality of memory pages p0, p2, p5, p11 (mp). As described by FIG. 10, the memory page p0 corresponds to the index level "0", and the memory page p2 corresponds to the index level "2". Similarly, the memory page p5 corresponds to the index level "1", and the memory page p11 corresponds to the index level "3".

According to FIG. 11A, the index levels "0-3" corresponding to each of memory pages p0, p2, p5 and p11 used by the job do not repeat each other. Therefore, during the execution of the job, the rewrite (that is, a slashing) of the data for the same cache line does not occur between the plurality of memory pages p0, p2, p5, p11.

In this embodiment, as illustrated in FIG. 11A, the program of the job is generated to suppress the slashing at the time of the job execution beforehand, for example. In other words, the program of the job is generated so that the group of the index levels corresponding to the plurality of memory pages "mp" which the job uses does not overlap. Therefore, as illustrated in FIG. 11A, for example, before relocation of memory pages mp, the group of the index levels corresponding to the plurality of memory pages "mp" which the job uses does not overlap each other.

FIG. 11B illustrates a state of the cache memory 103 when the memory pages "mp" is relocated from a state in FIG. 11A. According to the example in FIG. 11B, the operation system relocates the memory pages p0, p2, p5, p11 which the job uses to memory pages p1, p5, p8, p10 into the node "nd2". With relocation of the memory pages "mp", the address (physical address) of the memory pages "mp" which the job uses changes. As illustrated in FIG. 11B, with the change of the address, the address of memory page p1 and memory page p5 after the relocation corresponds with same index level "1".

In addition, the cache memory 103 in FIG. 11A and FIG. 11B is a cache memory of 2 ways. Therefore, when a different process uses the cache line "da-2" of index level "1", the rewrite processing of data for the cache line "da-2" occurs frequently at the time of the execution of the job, therefore a slashing in the cache memory 103 produces. When the slashing occurs, the latency of the processing time of the memory access increases, therefore the execute time of the job gets longer.

In this way, in the case of relocation, a plurality of memory pages "mp" (p0-p11) which the job uses are relocated by the memory pages mp corresponding to the same index level, therefore the slashing may occur. The operation system relocates the memory only based on the job resources of which the NUMA policy and the job require without considering the outbreak of the slashing.

First Embodiment

Therefore, the parallel computer, when continuing the execution of the job by migrating the job that first node "nd" is under the execution to the second node "nd", acquires index levels corresponding to first plurality of memory pages "mp" which stores data accessed by the job in the first node "nd". The first and second nodes "nd" have a plurality of memory pages (memory area) "mp" and the cache memory 103 each.

And the parallel computer judges whether the second node "nd" has second plurality of memory pages "mp" that are a usable state corresponding to the group of the index levels having same or relative position relations as the group of the index levels which is acquired. When the second node "nd" has the second plurality of memory pages "mp", the parallel computer moves data to the second plurality of memory pages "mp".

Figure 12:
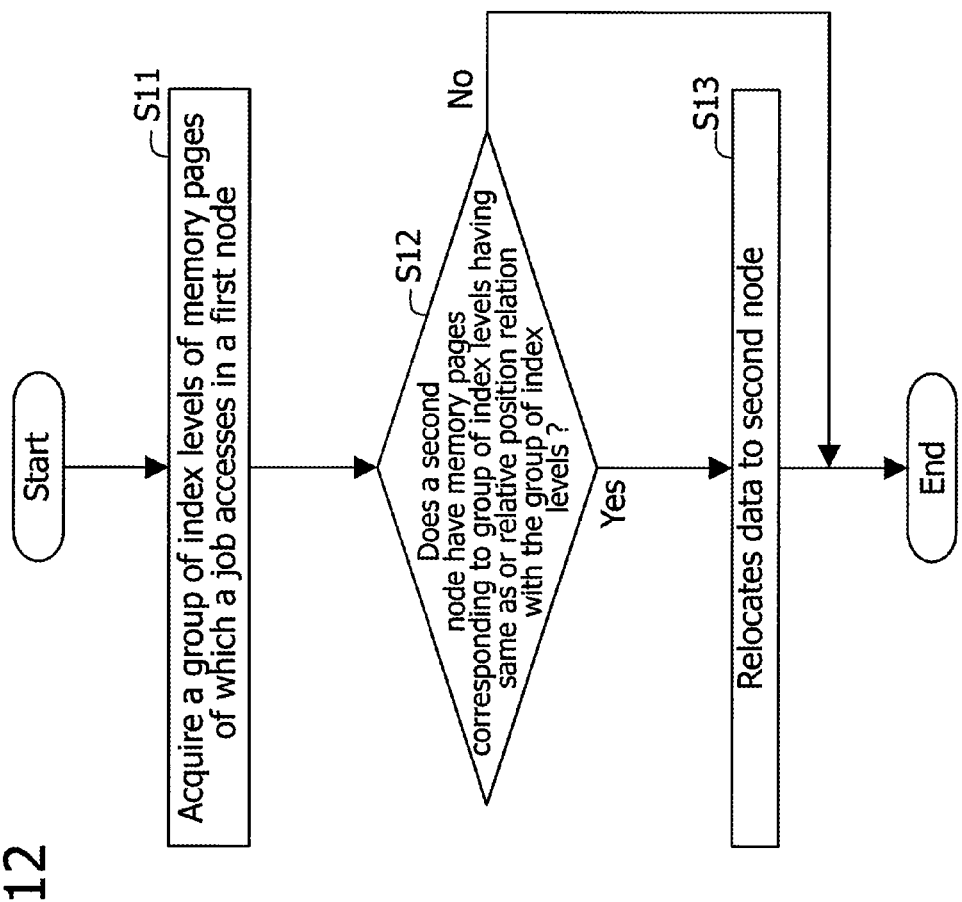
FIG. 12 is a diagram of flow chart explaining a summary of the processing of the parallel computer according to the first embodiment.

FIG. 12 is a diagram of flow chart explaining a summary of the processing of the parallel computer according to the first embodiment. By using the flow chart in FIG. 12, the relocation processing of memory pages "mp" when continuing the execution of the job by switching the job that the first node (relocation former node) "nd" under the execution to the second node (relocation destination node) "nd" will be described.

For example, the parallel computer according to the embodiment is one of the nodes "nd" depicted by FIG. 1 and FIG. 2. In addition, the embodiment represents an example of a case to relocate the memory pages mp of which the job under the execution uses into the node "nd2" from the node "nd1". Accordingly, in the embodiment, below the first node is called as the first node "nd1" and the second node is called as the second node "nd2".

S11: The parallel computer "nd" acquires the group of the index levels based on an address (top address) of the plurality of memory pages "mp" in the first node "nd1" where the data accessed by a migration target job were memorized.

S12: The parallel computer "nd" judges whether the second node "nd2" has a plurality of memory pages "mp" of the usable state corresponding to the group of the index levels having same index levels with the group of the index levels which are acquired or the group of the index levels having relative position relation with the group of the index levels which are acquired.

S13: When the second node "nd2" has usable plural memory pages "mp" (Yes of S12), the parallel computer "nd" moves the data of which the target job accesses in the second node "nd2" from the first node "nd1". On the other hand, when the second node "nd2" has not the usable plural memory pages "mp" (No of S12), the parallel computer "nd" does not relocate the job to the second node "nd2".

As described above, the program of the job is generated to suppress the outbreak of the slashing for the run time of the job, for example. In other words, the program of the job is generated to hold down the overlap of the index levels corresponding to the plurality of memory pages "mp" where the job accesses. Therefore, parallel computer "nd" according to the embodiment relocates the memory pages "mp" to maintain the correlation of the group of the index levels corresponding to the plurality of memory pages "mp" where the data accessed by the job before the relocation are memorized.

In other words, the parallel computer "nd" judges the tolerance level of the change of the index levels which suppresses the outbreak of the slashing in the cache memory 103. And the parallel computer "nd" judges whether the slashing does not occur after the relocation when the second node "nd2" has the usable memory pages "mp" corresponding to the group of the index levels in the tolerance level.

In this way, it is possible to evade that the plurality of memory pages "mp" of which the job uses corresponds to the same cache line by the relocation, thereby suppressing the outbreak of the slashing in the cache memory 103. Therefore, it is possible that the parallel computer "nd" prevents a drop of the memory access performance of the job to be caused by the outbreak of the slashing.

In addition, the parallel computer "nd", when relocating the memory pages "mp", does not change the correlation of the group of the index levels corresponding to the memory pages "mp" of which the job uses. In other words, in the case of relocation, the change of the correlation between the groups of the index levels which a user does not aim at does not occur. Thereby, it is possible to evade that a test result fluctuates regardless a presence or absence of the outbreak of the slashing with the relocation during the run time of tests such as the benchmark test, therefore the result of the test becomes stable. Therefore, it is possible that the user performs analysis or improvement based on a stable test result appropriately.

In addition, the relocation processing of the parallel computer "nd" according to the embodiment is not a thing limited to the relocation processing in the NUMA environment. In addition, the first and second nodes "nd1", "nd2" may be, for example, virtual machines and may be a different physical machine.

Then, according to FIG. 13, the hardware constitution of parallel computer "nd" according to the first embodiment will be described. Further, the software block diagram of parallel computer "nd" according to the first embodiment will be described according to FIG. 14. As described above, the parallel computer "nd" indicates one of the node "nd" included in the information processing device 10 depicted by FIG. 1 and FIG. 2. In addition, the parallel computer "nd" may be a different device from the node "nd" included in the information processing device 10.

[Hardware Constitution of Parallel Computer]

Figure 13:
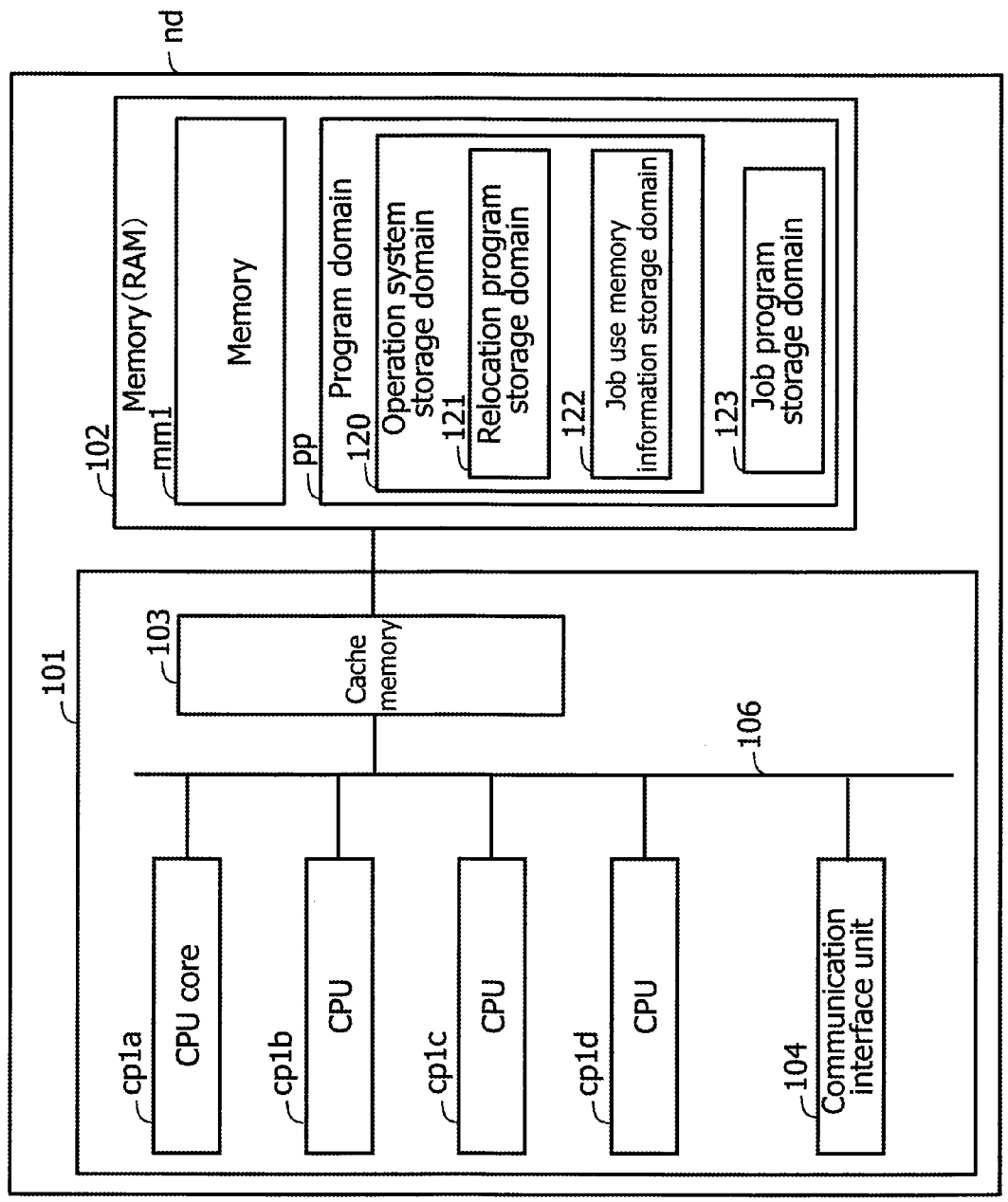
FIG. 13 is a diagram indicating the hardware constitution of parallel computer "nd" according to the first embodiment.

FIG. 13 is a diagram indicating the hardware constitution of parallel computer "nd" according to the first embodiment. The parallel computer "nd" depicted by FIG. 13 has a CPU unit 101 and a memory unit 102. The CPU unit 101 has a plurality of CPU cores "cp1a"-"cp1d" (cp) and a cache memory 103, a communication interface unit 104, etc. Each part in the CPU unit 101 is connected through a bus 106 mutually.

The plurality of CPU cores "cp" connect with the memory unit 102, etc. through the cache memory 103. The communication interface unit 104 connects with other node "nd" depicted by FIG. 1 and FIG. 2 and transmits and receives data. For example, the cache memory 103 depicted by FIG. 13 is L2 (Level2) cache.

The memory unit 102 is constructed by RAM (Random Access Memory) or a nonvolatile memory, for example. The memory unit 102 memorizes the data of which the CPU core "cp" processes. In addition, the memory unit 102 has a memory "mm1" having the data region and the program domain "pp". The memory "mm1" has static domain and heap area and is a domain to use for the run time of the program. As described above, the memory "mm1" has a plurality of memory pages (memory area) "mp".

In addition, the program domain "pp" is a domain storing a program translated for a machine language. For example, the program domain "pp" has operation system storage domain 120 and job program storage domain 123. In addition, the operation system storage domain 120 has relocation program storage domain 121 and job use memory information storage domain 122.

The operation system (below called as operation system 120) in the operation system storage domain 120 realizes the processing of operation systems working on the parallel compute "nd" by the execution of the CPU core "cp". The relocation program (below called as relocation program 121) in the relocation program storage domain 121 performs the relocation processing of job resources of the job under the execution. The details of relocation program 121 will be described later according to FIG. 14.

The job use memory information (below called as job use memory information 122) in the job use memory information storage domain 122 has information of the memory pages "mp" where the data accessed by each job were memorized. The details of job use memory information 122 will be described later according to FIG. 15.

The job program (below called as job program 123) in the job program storage domain 123 realizes the execution of the jobs on the operation system 120 by execution of the CPU core "cp". The jobs, for example, are analysis processing of data and large-scale computation processing, etc. The job program 123 is different depending on the job to carry out.

[Software Block of Parallel Computer]

Figure 14:
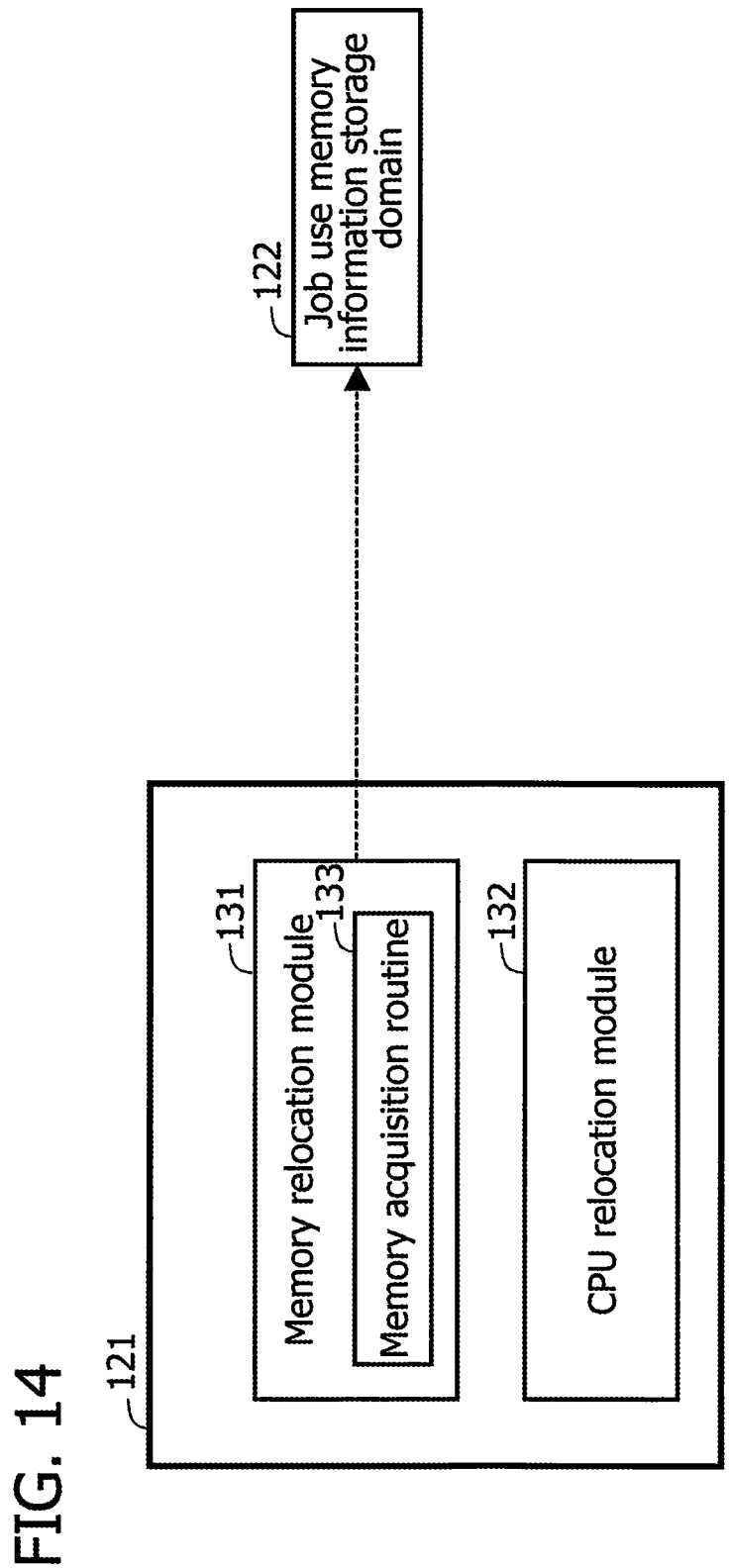
FIG. 14 is a diagram explaining a software block of parallel computer "nd" depicted by FIG. 13.

FIG. 14 is a diagram explaining a software block of parallel computer "nd" depicted by FIG. 13. The relocation program 121 depicted by FIG. 13 has a memory relocation module 131 and a CPU relocation module 132. In addition, the memory relocation module 131 includes a memory acquisition routine 133.

The memory relocation module 131 acquires information of the memory pages "mp" of which the job under the execution uses with reference to the job use memory information 122 (FIG. 13). And the memory relocation module 131 calls the memory acquisition routine 133.

The memory acquisition routine 133 judges whether the second node "nd2" has memory pages "mp" that are the usable state corresponding to the group of the index levels which have same as or relative position relations with the group of the index levels corresponding to memory pages "mp".

When judging that the second node "nd2" has the memory pages mp, the memory relocation module 131 relocates the memory pages "mp" into the second node "nd2". The details of the processing of memory relocation module 131 are described later according to a flow chart in FIG. 16.

The CPU relocation module 132 relocates the CPU core "cp", of which the job under the execution uses, into the CPU core "cp" in the different node "nd". For example, the CPU relocation module 132 changes the CPU core "cp" of which the job uses into the CPU core "cp" of the second node "nd2" when the second node "nd2" satisfies NUMA policy appointed for the job.

[Job Using Memory Information]

Figure 15:
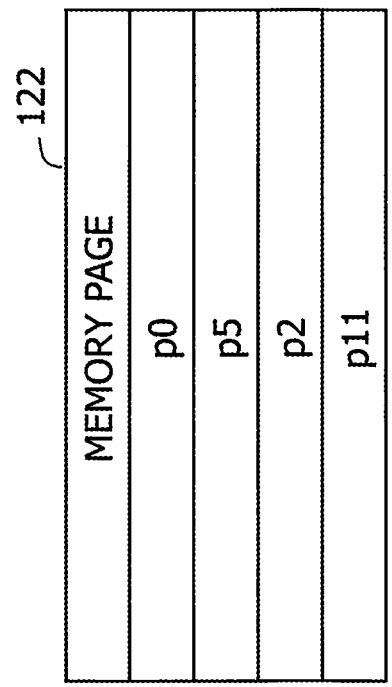
FIG. 15 is a diagram indicating an example of the job use memory information 122 depicted by FIG. 13 and FIG. 14.

FIG. 15 is a diagram indicating an example of the job use memory information 122 depicted by FIG. 13 and FIG. 14. The job use memory information 122 has information of memory pages "mp" where the data accessed by the job under the execution were memorized, namely memory pages mp of which the job under the execution uses.

The job use memory information 122 depicted by FIG. 15 has information of memory pages "mp" depicted by FIG. 11A. The job use memory information 122 depicted by FIG. 15 indicates that the memory pages "mp" where the data of which the job under the execution accesses were memorized is the memory pages p0, p2, p5, p11.

In addition, the job use memory information 122 has information of the memory pages "mp" of which the job uses for every job when the node "nd" carries out the plurality of jobs.

Figure 16:
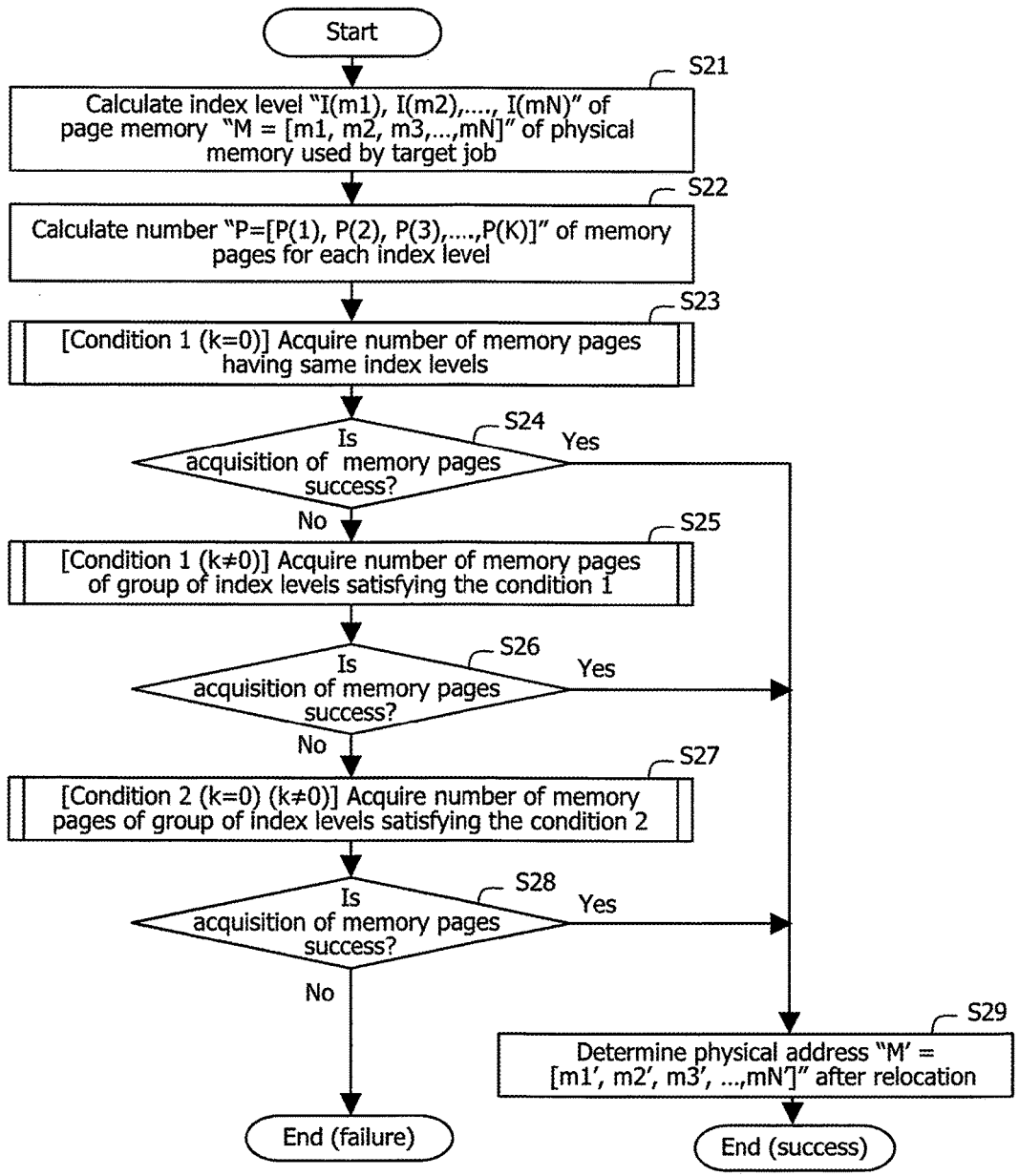
FIG. 16 is a diagram of flow chart explaining the details of the processing of memory relocation module 131 depicted by FIG. 13 and FIG. 14.

Then, according to FIG. 16-FIG. 22, the details of the processing of memory relocation module 131 depicted by FIG. 13, FIG. 14 will be described. FIG. 16 illustrates a flow diagram of the processing of memory relocation module 131, and FIG. 17A, FIG. 17B, FIG. 18, FIG. 19A, FIG. 19B, FIG. 20-FIG. 22 illustrate the details of some processing of the process depicted by FIG. 16.

[Processing of Memory Relocation Modules]

FIG. 16 is a diagram of flow chart explaining the details of the processing of memory relocation module 131 depicted by FIG. 13 and FIG. 14.

S21: The memory relocation module 131 acquires information of a plurality of memory pages "mp" in the first node "nd1" where the data of which the job for the migration accesses were memorized with reference to the job use memory information 122 (FIG. 15). And the memory relocation module 131 acquires the group of the index levels corresponding to the address of the plurality of memory pages "mp" which is acquired.

Especially, the memory relocation module 131 acquires addresses "M={m1,m2,m3, . . . , mN} (below called as address "M")" of memory pages "mp" in the first node "nd1" where the data of which the target job accessed were memorized. According to the example in FIG. 11A, the address "M" indicates value "0(=m1), 2(=m2), 5(=m3), 11(=m4)".

And the memory relocation module 131 acquires index levels "I={I (m1), I (m2), . . . I (mN)} (called as index level "I")" corresponding to the address "M". According to the example in FIG. 11A, the index level "I" indicates value "0(=I(0)), 2(=I(2)), 1(=I(5)), 3(=I(11))".

As described above, the memory relocation module 131 calculates the index level "I (mi)" based on an expression "mi % (K×s)". The value "K" indicates the number of cache lines, and the value "s" indicates the size of the cache line. The memory relocation module 131 acquires the number "K" of the cache line and the size "s" of the cache line from the hardware.

S22: The memory relocation module 131 calculates the number "P={P(1), P(2), P(3), . . . , P(K)} (called as memory pages "P") of the memory pages "mp" where the process of the target job uses in every index level. A value "P(r) (0<=r<K)" indicates the total number of the memory pages for the index level of the number "r".

In other words, the memory relocation module 131 totals each index level "I (mi)" which are calculated in the process S21 and calculates the total number of the memory pages for every index level "r". According to the example in FIG. 11A, the total number of the memory pages "P" indicates value "1(=P(1)), 1(=P(2)), 1(=P(3)), 1(=P(0))". In other words, according to the example in FIG. 11A, the number of memory pages for each index level is page 1.

S23: The memory relocation module 131 acquires the plurality of memory pages "mp" in the second node "nd2" corresponding to the group of the index levels satisfying a condition 1 (k=0). When the second node "nd2" has the plurality of memory pages "mp" corresponding to the group of the index levels satisfying condition 1 (k=0), a case indicates that the acquisition of the plurality of memory pages "mp" is possible. When the acquisition of the memory pages "mp" is success (Yes of S23), the memory relocation module 131 adds addresses of the plurality of memory pages "mp" which are acquired to the list "L (r)".

The set of the index levels satisfying the condition 1 (k=0) will be described according to FIG. 17A and FIG. 17B. In addition, the details of the processing of process S23 will be described later according to a flow chart in FIG. 18.

S24: The memory relocation module 131 judges whether the acquisition of memory pages mp "as" was success as a result of processing of process S23.

S25: When the acquisition of memory pages "mp" fails (No of S24), the memory relocation module 131 acquires the plurality of memory pages "mp" in the second node "nd2" corresponding to the group of the index levels satisfying the condition 1 (k≠0). When the second node "nd2" has the plurality of memory pages "mp" corresponding to the group of the index levels satisfying the condition 1 (k≠0), a case indicates that the acquisition of the plurality of memory pages "mp" is possible.

When the acquisition of the memory pages "mp" successes (Yes of S25), the memory relocation module 131 adds the addresses of the plurality of memory pages "mp" which are acquired to the list "L(r)". the group of the index levels satisfying the condition 1 (k≠0) will be described according to FIG. 19A and FIG. 19B. In addition, the details of the processing of process S25 will be described later according to a flow chart in FIG. 20.

S26: The memory relocation module 131 judges whether the acquisition of memory pages "mp" was success as a result of processing in the process S25.

S27: When the acquisition of the memory pages "mp" fails (No of S26), the memory relocation module 131 acquires the plurality of memory pages "mp" in the second node "nd2" corresponding to the group of the index levels satisfying the condition 2 (k=0)(k≠0). When the second node "nd2" has a plurality of memory pages "mp" corresponding to the group of the index levels satisfying the condition 2 (k=0)(k≠0), it indicates that the acquisition of the plurality of memory pages "mp" is possible.

When the acquisition of the memory pages "mp" is success (Yes of S27), the memory relocation module 131 adds the addresses of the memory pages "mp" which are acquired to the list "L(r)". The details of the processing of group of the index levels satisfying the condition 2 (k=0) (k≠0) and the process S27 will be described later according to a flow chart in FIG. 21.

S28: The memory relocation module 131 judges whether the acquisition of memory pages "mp" was success as a result of processing in process S27.

S29: When the acquisition of memory pages mp was success (one of Yes of S24, Yes of S26, and Yes of S28), the memory relocation module 131 acquires the address "M'" of the memory pages mp which are acquired from the list "L(r)". That is, the memory relocation module 131 determines the physical address "M'={m1', m2', m3', . . . , mN'} (below called as address "M'")" of memory pages mp in the second node nd2 which is a relocation destination.

The memory relocation module 131 copies the data memorized in memory pages mp of the address "M" in the first node "nd1" into the memory pages "mp" of the address "M'" in the second node "nd2". And the memory relocation module 131 changes the address of memory pages mp which are assigned to the process of the target job to the address "M'" from the address "M". After the change, the memory relocation module 131 releases the memory pages "mp" of the address "M".

In addition, when the acquisition of memory pages mp failed (No of S28), the memory relocation module 131 does not relocate the job into the second node "nd2". The memory relocation module 131 carries the processes in the flow chart of FIG. 16 for different node "nd", for example. In other words, the memory relocation module 131 searches different node "nd" which has the memory pages "mp" of the usable state corresponding relative to the group of the index levels having same as or relative position relation with the group of the index levels of the job under the execution.

[Group of the Index Levels Satisfying Condition 1 (k=0): Process S23]

Figure 17A:
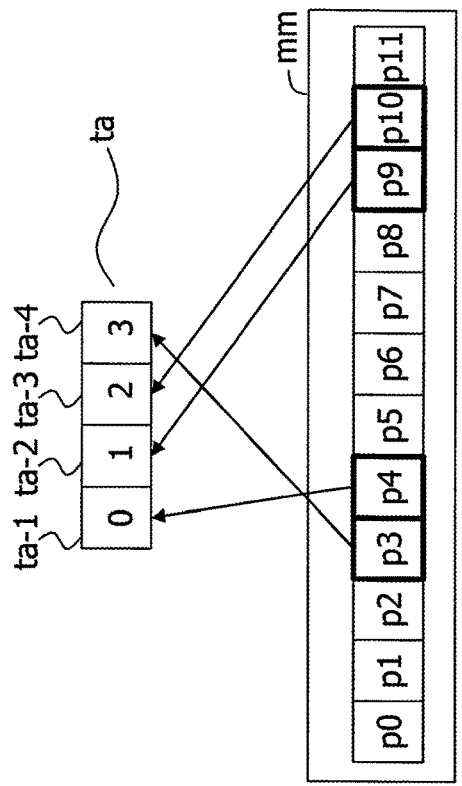
FIG. 17A and FIG. 17B are diagrams explaining the group of the index levels satisfying the condition 1 (k=0) which was indicated by process S23 of the flow chart of FIG. 16.
Figure 17B:
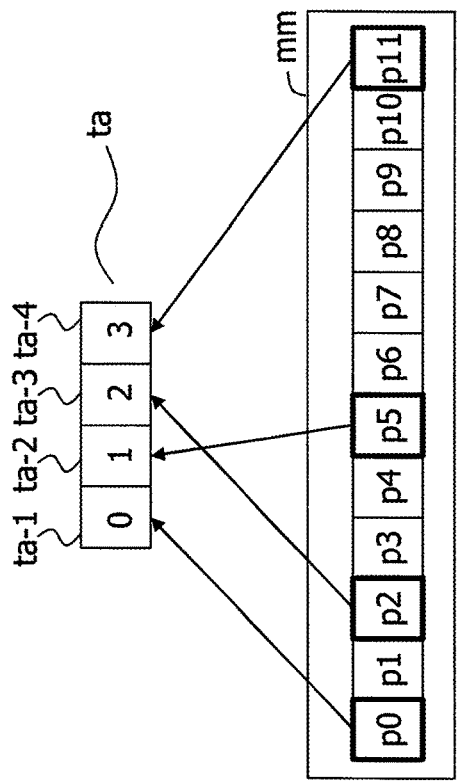

FIG. 17A and FIG. 17B are diagrams explaining the group of the index levels satisfying the condition 1 (k=0) which was indicated by process S23 of the flow chart of FIG. 16. The group of the index levels satisfying the condition 1 (k=0) indicates same group of the index levels as the group of the index levels corresponding to memory pages "mp" in the first node "nd1" where the data of which the job accesses were memorized. In other words, the group of the index levels satisfying the condition 1 (k=0) indicates the group of the index levels which is the same as index level "I" which was acquired in the process S22.

According to FIG. 17A, the index level "I" corresponding to the address "M" of the memory pages "mp" in the node "nd1" of which the job uses is the value "0,2,1,3". Therefore, the group of the index levels corresponding to condition 1 (k=0) are the index levels "0,2,1,3".

Then, according to FIG. 18, the details of the acquisition processing (process S23) of the plurality of memory pages mp in the second node "nd2" corresponding to the group of the index levels satisfying condition 1 (k=0) will be described.

[Process S23 in FIG. 16]

Figure 18:
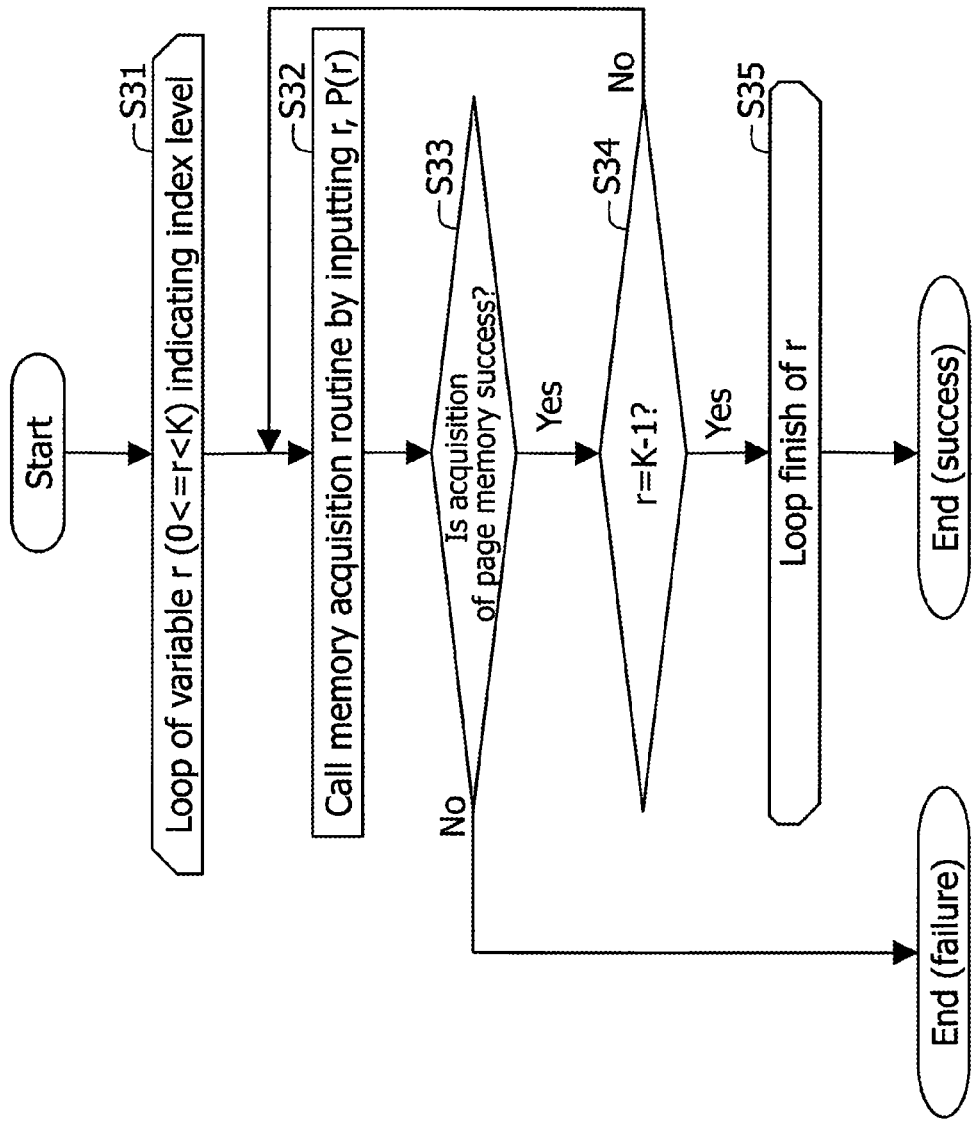
FIG. 18 is a diagram of flow chart explaining processing of process S23 in the flow chart of FIG. 16.

FIG. 18 is a diagram of flow chart explaining processing of process S23 in the flow chart of FIG. 16.

S31: The memory relocation module 131 repeats the processing of processes S32-S34 for the index level "r (0<=r<K)".

S32: The memory relocation module 131 calls the memory acquisition routine 133 by inputting the index level "r" and the number of memory pages "P(r)" of the index level concerned. The memory acquisition routine 133 carries out the processing which repeatedly acquires the memory pages "mp" corresponding to index level "r" as much as the number of memory pages "p(r)". The details of the processing of the memory acquisition routine 133 will be described later according to FIG. 22.

According to the example of FIG. 17A, the memory relocation module 131, in the case of index level "r=0," memory relocation module 131 calls the memory acquisition routine 133 by inputting the index level "r=0" and the number of memory pages "P(r)=1". Similarly, in the case of index level "r=1", the memory relocation module 131 calls the memory acquisition routine 133 by inputting the index level "r=1" and the number of memory pages "P(r)=1".

S33: The memory relocation module 131 judges whether the acquisition of memory pages mp was success according to the memory acquisition routine 133. When the acquisition of the memory pages mp failed (No of S33), the memory relocation module 131 finishes the processing of the process S23 (failure).

S34: When the acquisition of memory pages mp was success (Yes of S33), the memory relocation module 131 judges whether the index level "r" equals with the value "K−1", namely whether the memory pages mp were acquired for all index levels.

S35: When the variable "r" equals with the value "K−1" (Yes of S34), the memory relocation module 131 finishes the loop and completes the processing of process S23 (success). In this way, the memory relocation module 131 acquires the memory pages of the number of memory pages "P(r)" sequentially from the index level "0" to the index level "K−1".

Thereby, as illustrated in FIG. 17B, the memory relocation module 131 acquires the memory pages p4, p10, p9, p3 (mp) of the second node "nd2" corresponding to the group "0,2,1,3" of the index level. The addresses "4(=m1'), 10(=m2'), 9(=m3'), 3(=m4')" of the memory pages p4, p10, p9, and p3 (mp) which are acquired indicates the group "0,2,1,3" of the index level.

According to FIG. 17A, FIG. 17B and FIG. 18, the group of the index levels corresponding to the plurality of memory pages mp of which the job uses does not change before and after the relocation. Therefore, when the address of memory pages mp is controlled so that the slashing does not occur in the job before the relocation, it is possible to restrain the outbreak of the slashing with the relocation by relocating the memory pages mp so that the group of the same index levels is maintained.

[Group of the Index Levels Satisfying Condition 1 (k≠0]: Process S25]

Figure 19A:
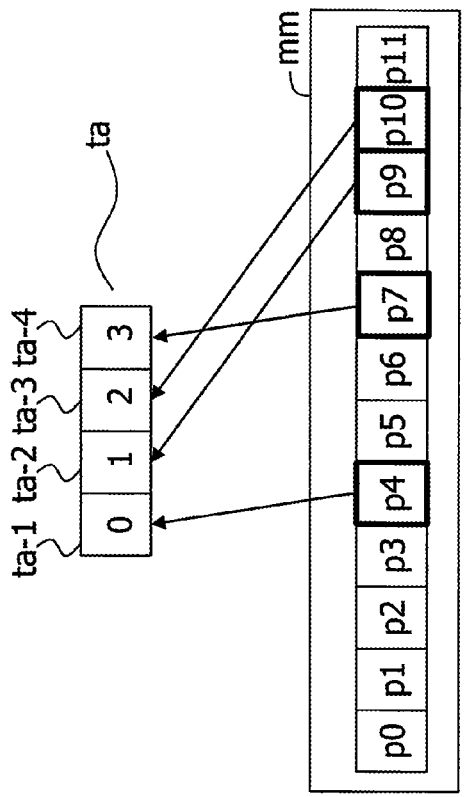
FIG. 19A and FIG. 19B are diagrams explaining the group of the index levels satisfying the condition 1 (k≠0) depicted in the process S25 of the flow chart of FIG. 16.
Figure 19B:
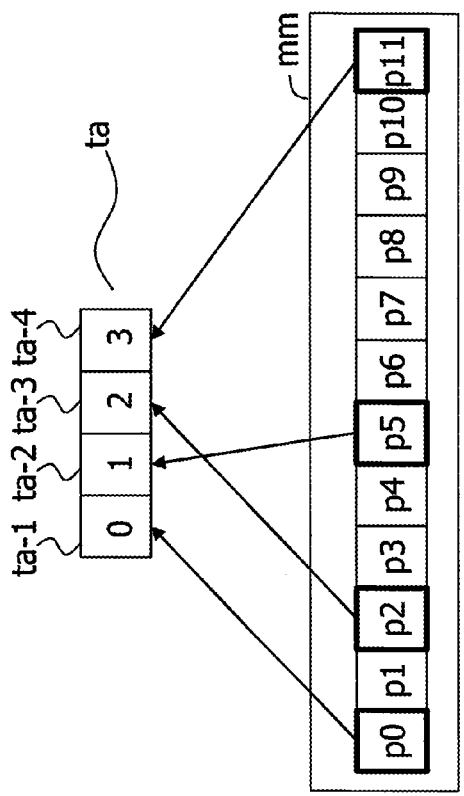

FIG. 19A, FIG. 19B are diagrams explaining the group of the index levels satisfying the condition 1 (k≠0) depicted in the process S25 of the flow chart of FIG. 16. In FIG. 19A and FIG. 19B, same elements as illustrated in FIG. 17A and FIG. 17B are represented by same sign. In addition, the plurality of memory pages mp which the job uses before the relocation depicted in FIG. 19A are similar to that in FIG. 17A.

The group of the index levels satisfying the condition 1 (k≠0) is the group of the index levels having relative position relation with the group of the index levels corresponding to the addresses "M" of the memory pages "mp". In other words, the group of the index levels satisfying the condition 1 (k≠0) is the group of the index levels of which the group of the index levels corresponding to addresses "M" are shifted at the same level uniformly.

According to FIG. 19A, the index level "I" corresponding to the address "M" is value "0,2,1,3". The group of the index levels satisfying the condition 1 (k≠0) is the group of the index levels of the index level "I+k (k≠0)". In other words, the group of the index levels satisfying the condition 1 (k≠0) is either one of a group "I={1,3,2,0}", a group "I={2,0,3,1}" and a group "I={3,1,0,2}".

Then, according to FIG. 20, the details of the acquisition processing (process S25) of memory pages mp in the second node nd2 corresponding to the group of the index levels satisfying the condition 1 (k≠0) will be described.

[Process S25 in FIG. 16]

Figure 20:
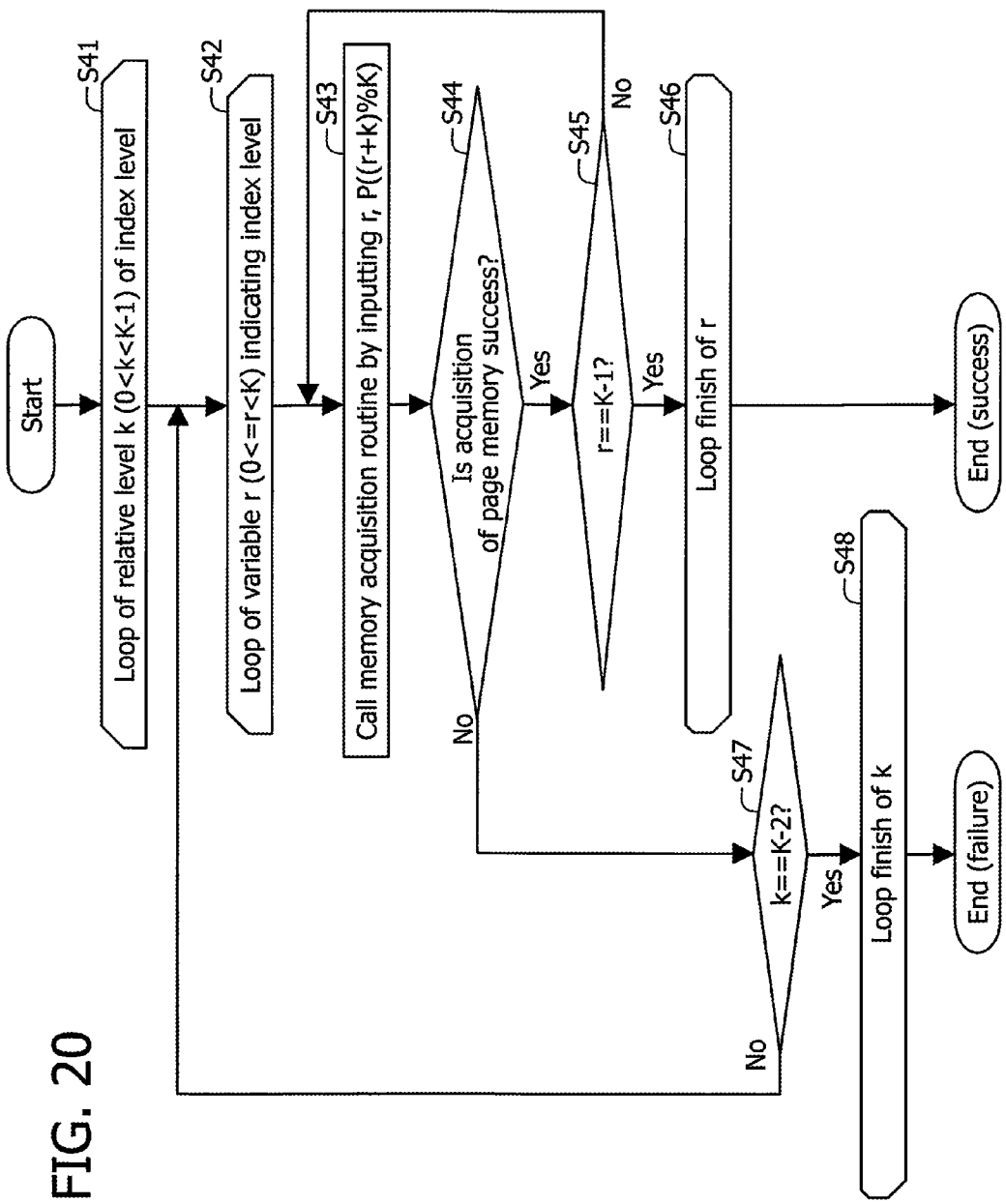
FIG. 20 is a diagram of flow chart explaining processing of process S25 in the flow chart of FIG. 16.

FIG. 20 is a diagram of flow chart explaining processing of process S25 in the flow chart of FIG. 16.

S41: The memory relocation module 131 repeats the processing of processes S42-S47 for the relative value "k (0<k<K−1)" which indicates the relative position to shift.

S42: The memory relocation module 131 repeats the processing of processes S43-S45 for the index level "r (0<=r<K)".

S43: The memory relocation module 131 calls the memory acquisition routine 133 by inputting the index level "r" and the number of memory pages "p ((r+k) % K)" corresponding to the index level concerned. In other words, the memory acquisition routine 133 carries out the processing which repeatedly acquires the memory pages mp corresponding to the index level "r", of the number of the memory pages corresponding to the index levels which are shifted by the relative value "k".

Especially, the memory relocation module 131, in the case of relative value "k=1", calls the memory acquisition routine 133 by inputting the index level "r={1,2,3, . . . , K−1}" and the number "P(1), P(2), P(3), . . . , P(0)" of memory pages. In addition, the memory relocation module 131, in the case of relative value "k=2", calls the memory acquisition module 133 by inputting the index level "r={1,2,3, . . . , K−1}" and the number "P(2), P(3), P(0), . . . , P(1)" of memory pages.

S44: The memory relocation module 131 judges whether the acquisition of the memory pages mp was success according to the memory acquisition routine 133.

S45: When the acquisition of the memory pages mp was success (Yes of S44), the memory relocation module 131 judges whether the index level "r" equals to the value "K−1", in other words, whether the memory pages mp corresponding to all index levels are acquired.

S46: When the index level "r" equals with the value "K−1" (Yes of S45), it indicates the case that the acquisition of the memory pages mp of all index levels is success. Therefore, the memory relocation module 131 finishes a loop and completes the processing of the process S25 (success). On the other hand, when the variable "r" does not match with the value "K−1" (No of S45), the memory relocation module 131 increments index level "r" and carries out the processing of the process S45.

S47: On the other hand, when the acquisition of the memory pages "mp" failed (No of S44), the memory relocation module 131 whether the relative value "k" matches with the value "K−2", in other words, whether the memory acquisition processing is tried for all relative value. When the relative value "k" does not match with the value "K−2" (No of S47), the memory relocation module 131 increments the relative value "k" and carries out the processing of the processes S42-S46.

S48: When the relative value "k" matches with the value "K−2" (Yes of S47), it indicates the case that the acquisition processing of memory failed although the memory acquisition processing was tried for all relative values. Therefore, the memory relocation module 131 finishes the loop and finishes the processing of process S25 (failure).

In this way, as illustrated in FIG. 19B, the memory relocation module 131 acquires a group of memory pages mp corresponding to the group of the index levels of which the group "0,2,1,3" of the index levels are shifted by the relative value "k" uniformly. According to the example of FIG. 19B, the memory relocation module 131 acquires the memory pages p9, p7, p10, p4 (mp) corresponding to the group "1,3,2,0" of the index levels of which group "0,2,1,3" of the index levels are shifted by the relative value "k=1".

According to FIG. 19A, FIG. 19B, FIG. 20, although the group of the index levels corresponding to the plurality of memory pages mp of which the job uses changes before and after the relocation, the group of the index levels shifts uniformly. Therefore, when the address of memory pages mp is controlled before relocation so that the slashing does not occur in the job, it is possible to evade that the index levels duplicates between the memory pages mp after the relocation. In other words, it is possible to restrain the outbreak of the slashing with the relocation by relocating the memory pages mp so that the group of the index levels shifts uniformly.

[Group of the Index Levels Satisfying Condition 2 (k=0) (k≠0)]

Then, according to FIG. 21, the details of the acquisition processing (process S27) of memory pages mp in the second node "nd2" corresponding to the group of the index levels satisfying the condition 2 (k=0) (k≠0) will be described.

The group of the index levels satisfying the condition 2 (k=0)(k≠0) is similar to the group of the index levels which is explained in FIG. 17A, FIG. 17B, FIG. 19A, FIG. 19B. But, according to the condition 2, the group of the index levels may be different from memory pages mp before and after the relocation. Based on FIG. 17 A, FIG. 17B, FIG. 19A, FIG. 19B, this subject will be specifically described.

According to FIG. 17A and FIG. 17B, the memory page p0 before the relocation corresponds with the memory page p4 after the relocation. Therefore, the index level "0 corresponding to the memory page p0 before the relocation is same as the index level "0" corresponding to the memory page p4 after the relocation. It is similar about other memory page mp.

In contrast, according to the condition 2, the index levels corresponding to the memory pages mp before the relocation may be different from an index levels corresponding to memory pages mp after the relocation.

For example, the memory page p0 before the relocation may correspond with the memory page p10 after the relocation corresponding to the index level "2". In this case, for example, any one of memory pages p2, p5, and p11 before the relocation corresponds with the memory page p4 after the relocation.

Similarly, according to FIG. 19A, and FIG. 19B, the memory page p0 before the relocation corresponds with the memory page p9 after the relocation which is shifted an index level by the relative value "1". Therefore, the index level "0" corresponding to the memory page p0 before the relocation is the value that is shifted the index level "0" corresponding to the memory page p4 after the relocation by the relative value "1". It is similar about other memory page mp.

In contrast, according to the condition 2, the index levels corresponding to the memory pages mp before the relocation may be different from index levels which are shifted index levels corresponding to the memory pages mp after the relocation by a relative value. For example, the memory page p0 before the relocation corresponds with the memory page p7 after the relocation corresponding to the index level "3", and the memory page p2 before the relocation may corresponds with the memory page p10 after the relocation corresponding to index level "2" which is the same as that before the relocation.

[Process S27 of FIG. 16]

Figure 21:
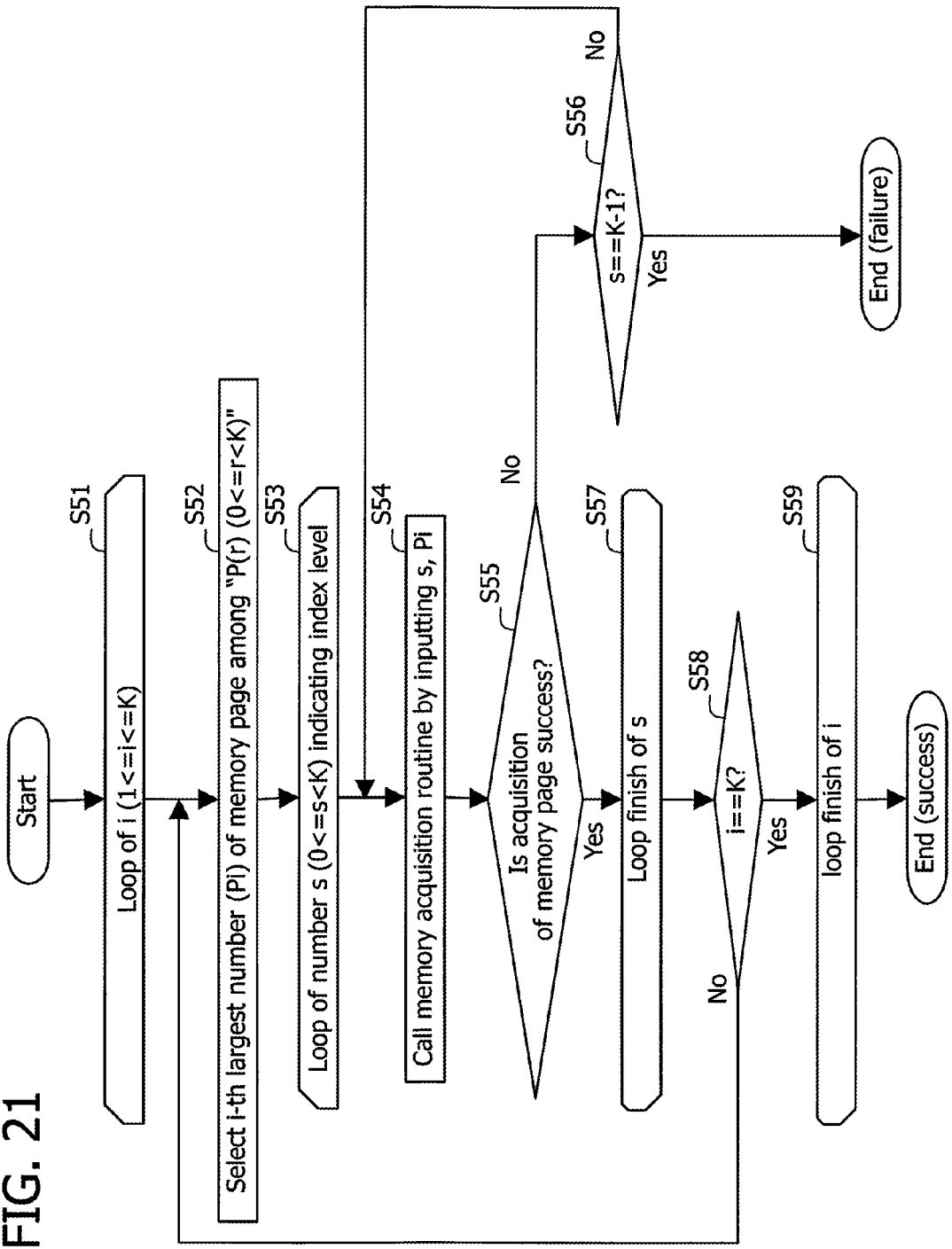
FIG. 21 is a diagram of flow chart explaining processing of process S27 in the flow chart of FIG. 16.

FIG. 21 is a diagram of flow chart explaining processing of process S27 in the flow chart of FIG. 16.

S51: The memory relocation module 131 repeats the processing of process S52-S58 for the variable "i (1<=k<=K)" indicating the counter of the index level.

S52: The memory relocation module 131 selects a i-th largest number of memory pages "mp" among the number "p(r) (0<=r<K)" of memory pages of each index level and sets it in the variable "Pi".

S53: The memory relocation module 131 repeats the processing of processes S54-S55 for the variable "s (0<=s<K)" indicating the group of the index levels satisfying the condition 1 (k=0) (k≠0) as mentioned above. In addition, after the variable "i=2" time, the memory relocation module 131 selects the index level "s" which excluded index level "s" that memory pages mp has been got.

S54: The memory relocation module 131 calls the memory acquisition routine 133 by inputting the index level "s" and the number of the memory pages "P(i)" corresponding to the index level concerned. In other words, the memory relocation module 131 sequentially acquires the memory pages mp of the index level "s" which is possible to acquire the memory pages concerned in decreasing order of the number of memory page.

According to the example of FIG. 17A, FIG. 17B and FIG. 19A, FIG. 19B, the number of memory pages of each index level are value "1". In an example of FIG. 19A and FIG. 19B, when the number of memory pages corresponding to the index level "0" is value "2," the memory relocation module 131 searches for the index level which is possible to acquire the number of memory pages "2" among the index levels "0,1,2,3".

S55: The memory relocation module 131 judges whether the acquisition of the memory pages mp is success according to the memory acquisition routine 133.

S56: When the acquisition of the memory pages mp fails (No of S55), the memory relocation module 131 judges whether the index level "s" equals with the value "K−1".

When the index level "s" does not equal with the value "K−1" (No of S56), the memory relocation module 131 increments the index level "s" and repeats the processing of process S54 and process S55. On the other hand, when the index level "s" equals with the value "K−1" (Yes of S56), it indicates that the index level which is possible to acquire the number of the memory pages "Pi" does not exist. Therefore, the memory relocation module 131 finishes the processing of process S27 (failure).

S57: On the other hand, when the acquisition of the memory pages mp is success (Yes of S55), the memory relocation module 131 finishes a loop of the index level "s".

S58: The memory relocation module 131 judges whether the variable "i" indicating the counter equals with the value "K", namely, whether the memory acquisition processing were tried for all index levels.

S59: When the variable "i" equals with the value "K" (Yes of S58), it indicates that the memory acquisition processing were tried for all index levels. Therefore, the memory relocation module 131 finishes the loop and completes the processing of process S25 (success). On the other hand, when the variable "i" does not equal with the value "K" (No of S58), the memory relocation module 131 increments the relative value "i" of the index level and carries out the processing of process S52-S58.

In this way, the memory relocation module 131 acquires the memory pages p9, p7, p10, p4 in the second node "nd2" depicted in FIG. 19A and FIG. 19B. But, according to the condition 2, a combination of memory pages p0, p2, p5, p11 before the relocation and the memory pages p9, p7, p10, p4 in the second node "nd2" after the relocation may be any one of combination.

According to the example of FIG. 21, the group of the index levels corresponding to the plurality of memory pages mp which the job uses is the same or shifts uniformly, before and after relocation. Therefore, it is possible to restrain the outbreak of the slashing with the relocation as mentioned above, when the address of memory pages mp is controlled before relocation so that the slashing does not occur in the job.

[Processing of Memory Acquisition Routine]

Figure 22:
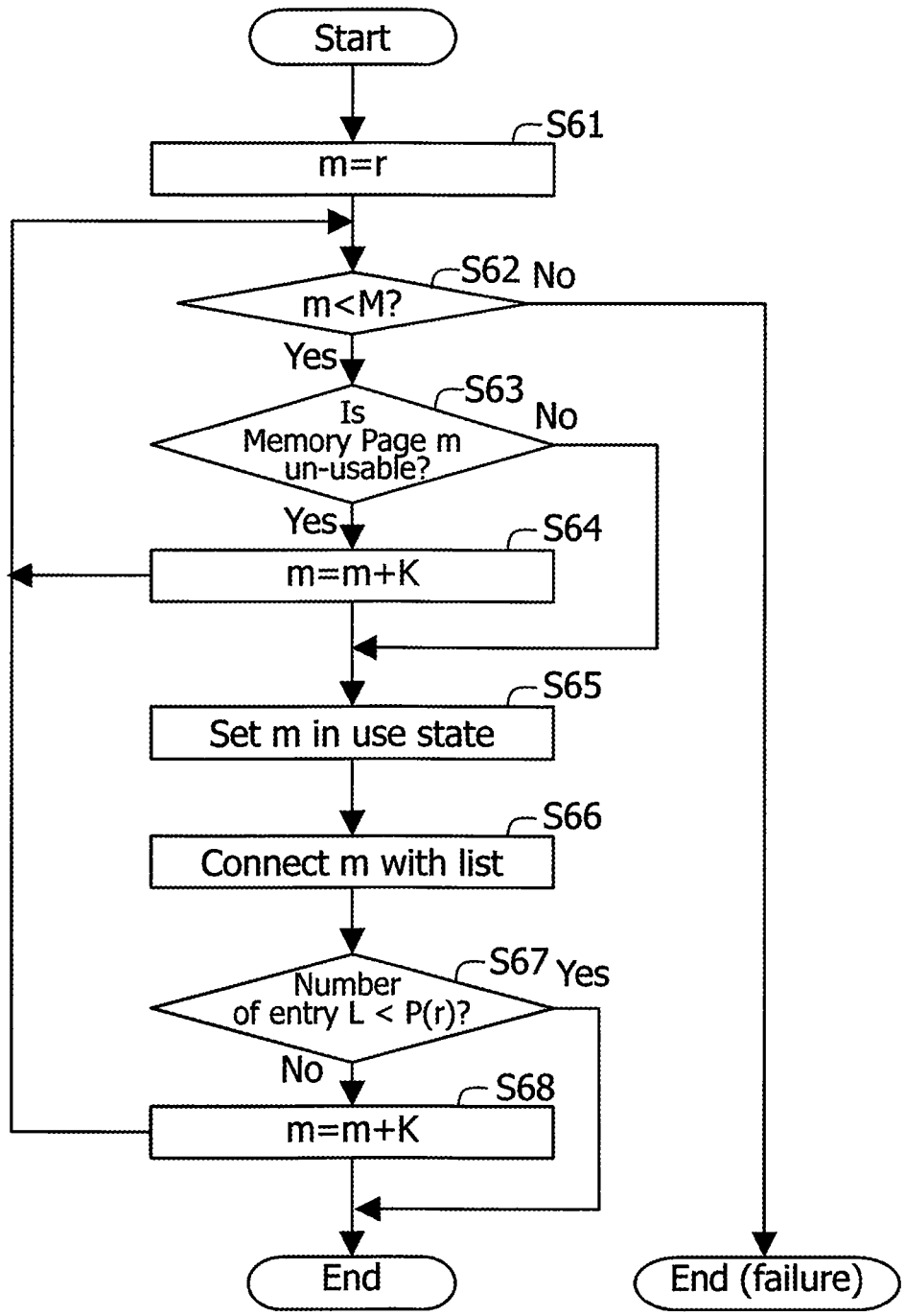
FIG. 22 is a diagram of flow chart explaining processing of the memory acquisition routine 133.

FIG. 22 is a diagram of flow chart explaining processing of the memory acquisition routine 133. The value "r" which is a first parameter of the memory acquisition routine 133 indicates an index level corresponding to the memory page mp for the acquisition, and the value "P(r)" which is a second parameter indicates the number of memory pages for the acquisition.

S61: The memory acquisition routine 133 sets the smallest address of memory page mp corresponding to the value "r" which is the parameter in the variable "m" indicating the top address of the memory page mp.

S62: The memory acquisition routine 133 judges whether the address "m" is within an address range of the memory "mm" in the second node "nd2". When the address exceeds the address range (No of S62), the memory acquisition routine 133 finishes the processing (failure). In this case, the memory acquisition routine 133 sets an invalid address "NULL" in the list "L(r)" and outputs it to the memory relocation module 131.

S63: On the other hand, when judging that the address "m" is within the address range (Yes of S62), the memory acquisition routine 133 judges whether the memory page mp of address "m" is in usable state. The memory acquisition routine 133 is able to acquire a use state of the memory page mp based on management information of the operating system.

S64: When the memory page mp is in un-usable state (Yes of S63), the memory acquisition routine 133 increments the address "m" in an address of next memory page mp corresponding to the same index level. And the memory acquisition routine 133 carries out the processing of the processes S62, S63 for the address "m" which is incremented.

In this way, the memory acquisition routine 133 searches usable memory page mp from a set "m(=r), m+K, m+2K, m+3K, . . . " of the address of memory page mp corresponding to the index level "r" in the memory mm of second node "nd2".

S65: When the memory page mp is usable state (No of S63), the memory acquisition routine 133 sets the memory page mp of the address "m" in a use state.

S66: The memory acquisition routine 133 connects (adds) the address "m" of memory page mp which is set in the use state in the list "L(r)".

S67: The memory acquisition routine 133 judges whether the number of entries in the list "L(r)" reached the number of memory pages "P(r)" for the acquisition as a parameter.

S68: When the number of entries do not reach the number of memory pages "P(r)" for the acquisition (No of S67), the memory acquisition routine 133 increments the address "m" in an address of next memory page mp corresponding to the same index level. And the memory acquisition routine 133 carries out the processing of process S62, S63 for the address "m" which is incremented.

On the other hand, when the number of entries reach the number of memory pages "P(r)" for the acquisition (Yes of S67), the memory acquisition routine 133 completes the processing (success). The memory acquisition routine 133 outputs the list "L(r)" of address of the memory pages mp of the number of memory pages "p(r)" to the memory relocation module 131.

Second Embodiment

The parallel computer "nd" according to the second embodiment selects a node of the relocation destination of the memory among the plurality of candidate nodes.

The parallel computer "nd", when there are a multiple target candidate nodes of migration destination of the job that the first node nd1 is under the execution, acquires the group of the index levels having same as or relative position relation with the group of the index levels about each of plurality of candidate nodes. In addition, the parallel computer "nd" calculates a judgment value indicating the outbreak degree of the slashing after the migration based on the use situation of plural memory pages mp in the candidate node corresponding to the group of the index levels which is acquired. And the parallel computer "nd" selects the candidate node that the judgment value is smallest as the second node "nd2" and moves data to the memory area of selected second node "nd2".

In this way, it is possible that the parallel computer "nd" according to the second embodiment selects candidate node, which has a higher degree of use of the plurality of memory pages mp corresponding to the group of the index levels which has same or relative position relations, as the relocation destination node nd. In other words, it is possible that the parallel computer "nd" selects a candidate node having less incidence of the slashing by the relocation among the plurality of candidate nodes and relocates the memory pages mp.

In addition, the parallel computer "nd" relocates the memory pages mp so as to maintain the correlation of the group of the index levels corresponding to plural memory pages mp where the data accessed by the job before relocation are memorized. In this way, it is possible to evade that the plural memory pages mp which the job uses corresponds to the same cache line with the relocation, and to control the outbreak of the slashing in the cache memory 103. Thereby, it is possible that the parallel computer "nd" controls a drop of the memory access performance of the job to be caused by the outbreak of the slashing.

Figure 23:
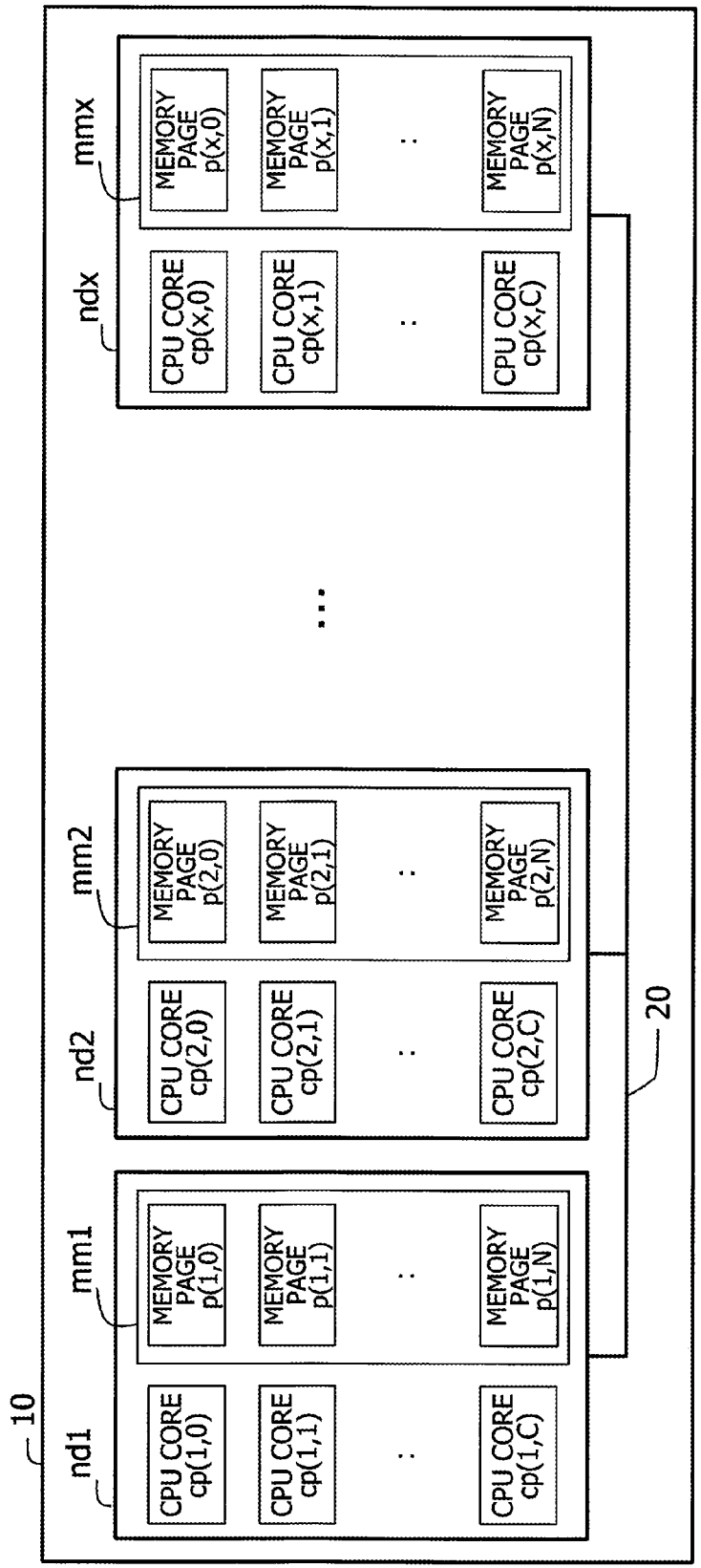
FIG. 23 is a diagram explaining an example of information processing device 10 according to the second embodiment.

FIG. 23 is a diagram explaining an example of information processing device 10 according to the second embodiment. In FIG. 23, same elements as illustrated in FIG. 1 and FIG. 2 are represented by same sign.

As illustrated in FIG. 23, the information processing device 10 has node "nd1"-node "ndx". In the second embodiment, the memory pages mp which memory mm1 in the node "nd1" has are called as memory pages p (1,0)-p (1,N). Similarly, the memory pages mp which the memory "mmx" in the node "ndx" has are called as memory pages p (x,0)-p (x,N).

In addition, CPU core "cp" in the node "nd1" are called as CPU core cp (1,0)-cp (1,N) and CPU core "cp" in the node "ndx" are called as CPU core cp (x,0)-cp (x,N).

Figure 24:
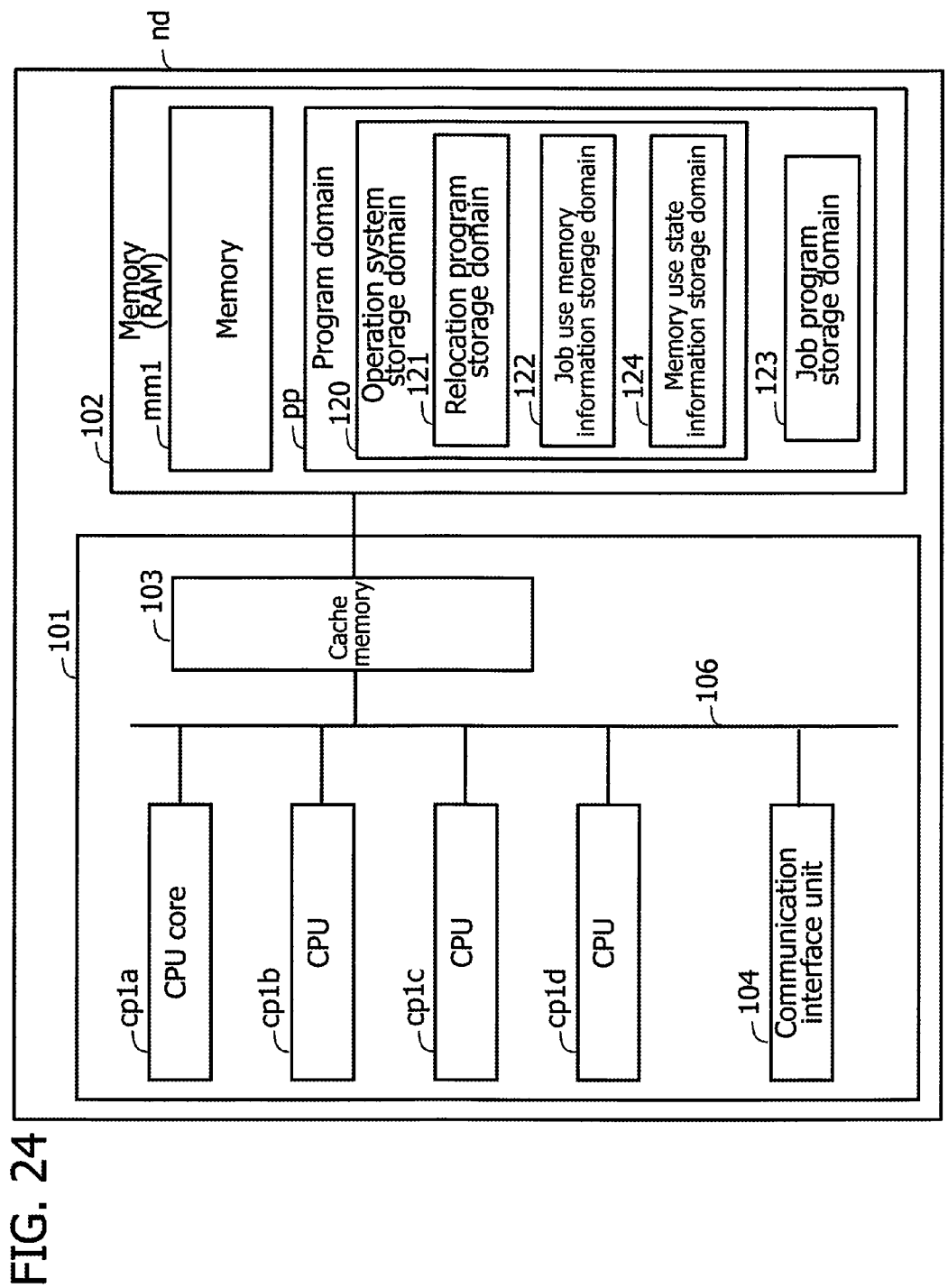
FIG. 24 is a diagram of hardware constitution of parallel computer "nd" according to the second embodiment.

FIG. 24 is a diagram of hardware constitution of parallel computer "nd" according to the second embodiment. The parallel computer "nd" depicted by FIG. 24 represents one of the node "nd" which the information processing device 10 in FIG. 23 has as same as the first embodiment, for example. In FIG. 24, same elements as illustrated in FIG. 13 are represented by same sign.

Operation system storage domain 120 in the parallel computer "nd" depicted by FIG. 24 further has memory use state information storage domain 124 for the parallel computer nd in the first embodiment depicted by FIG. 13.

The memory use state information (below called as memory use state information 124) in the memory use state information storage domain 124 has a use state of memory pages mp for every node depending on an index level. The details of memory use state information 124 will be mentioned later according to FIG. 27. In addition, the job use memory information 122 according to the second embodiment includes information of the memory pages mp which store data accessed by each job in correspondence with the index level.

[Software Block of Parallel Computer]

Figure 25:
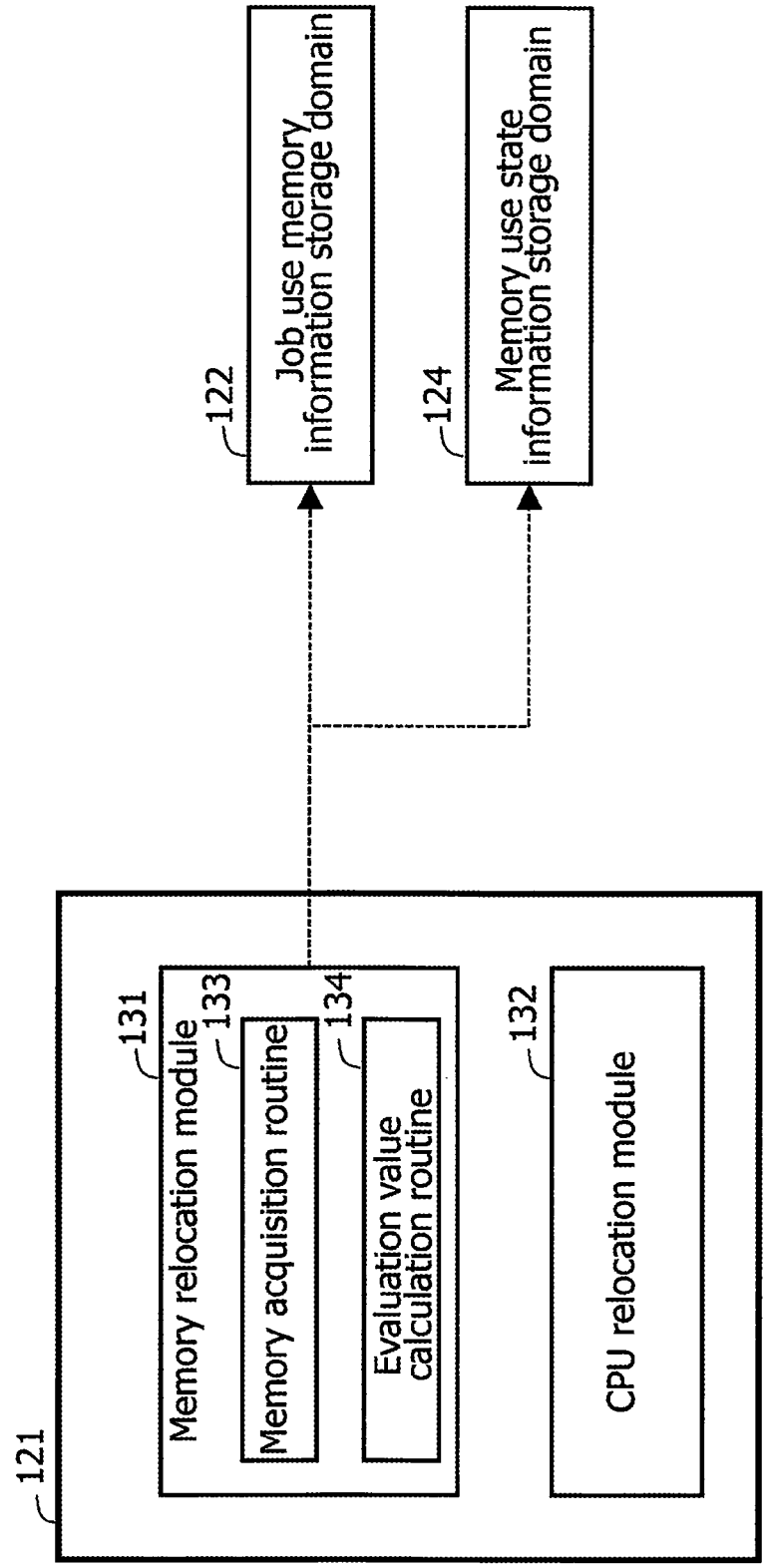
FIG. 25 is a diagram explaining a software block of parallel computer "nd" depicted by FIG. 24.

FIG. 25 is a diagram explaining a software block of parallel computer "nd" depicted by FIG. 24. In FIG. 25, same elements as illustrated in FIG. 14 are represented by same sign. The CPU relocation module 132 is similar to that of the first embodiment.

The memory relocation module 131 depicted by FIG. 25 further includes evaluation value calculation routine 134 for the memory relocation module 131 in the first embodiment depicted by FIG. 14. In addition, the memory relocation module 131 refers to the memory use state information 124 more. The details of the processing of memory relocation module 131 according to the second embodiment will be mentioned later according to a flow chart of FIG. 28.

The evaluation value calculation routine 134 refers to the memory use state information 124 and calculates a judgment value indicating the outbreak degree of the slashing after the migration for every candidate node "nd", based on use situation of the memory pages in the candidate node "nd" corresponding to the group of the index levels having same or relative position relations.

And the memory relocation module 131 moves data stored in the memory area in the first node "nd" where the job under the execution accesses into the candidate node "nd" of the judgment value that the outbreak degree of the slashing is smaller. In addition, the memory relocation module 131 moves data into the candidate node "nd" according to the first embodiment then.

[Job Use Memory Information]

FIG. 26 is a diagram explaining an example of job use memory information 122 according to the second embodiment depicted by FIG. 24 and FIG. 25. As illustrated in FIG. 26, the job use memory information 122 in the second embodiment includes information of memory pages mp and the information of the number of memory pages of which the job under the execution uses for every index level.

In FIG. 26, the job use memory information 122 indicates that the memory pages mp of which the job under the execution in the node "i" uses is the memory pages p (i,0), p (i, K), p (i,1), p (i,3). In addition, the job use memory information 122 indicates that the memory pages p (i,0), p (i, K) correspond to the index level "0". Therefore, the number of memory pages of the index level "1" is value "2". Similarly, the numbers of the memory pages of the index levels "1" and "3" are value "1".

[Memory Use State Information]

FIG. 27 is a diagram explaining an example of memory use state information 124 depicted by FIG. 24 and FIG. 25. The memory use state information 124 indicates a use state of memory pages mp corresponding to the index levels for every node. FIG. 27 illustrates the memory use state information 124 of node "i".

As illustrated in FIG. 27, the memory use state information 124 indicates a use state of memory page mp for each of index level. A state "non-use" indicates an unused state which does not use the memory page mp. A state "used" (caching use of the file) indicates a state to use memory page mp at one time for the purpose of cache. In addition, a state "used" (not used recently) indicates the use state that the scheduled period passes after having accessed last time although it is in-use. In addition, a state "used" (used recently) indicates the state that be in-use and scheduled period does not pass after having accessed it last time.

As illustrated in the job use memory information 122 in FIG. 26, the memory pages mp which the job under the execution in the node "i" uses is memory pages p (i,0), p (i, K), p (i,1), p(i,3). Therefore, according to the memory use state information 124 depicted by FIG. 27, the memory pages p (i,0), p (i, K), p (i,1), p (i,3) indicates state "occupied" (used recently).

In addition, according to the memory use state information 124 depicted by FIG. 27, the memory page p (i, 5K−1) indicates the state "used" (not used recently). In addition, the memory page p (i, 2K+1) indicates the use state "non-use", and the memory page p (i, K−1) indicates the state "used" (used recently).

Figure 28:
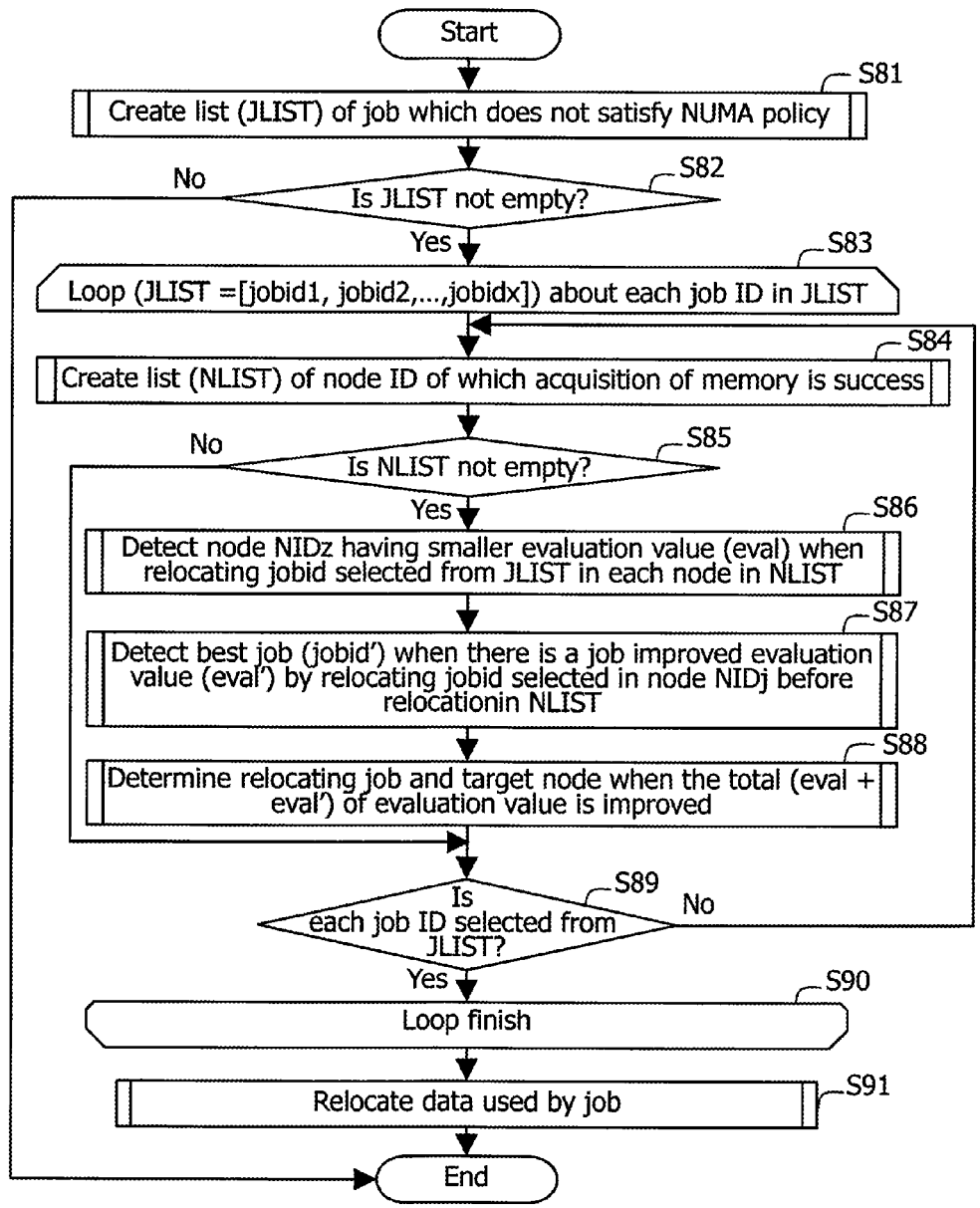
FIG. 28 is a diagram of flow chart explaining the details of the processing of memory relocation module 131 according to the second embodiment depicted by FIG. 24 and FIG. 25.

Then, according to FIG. 28-FIG. 35, the details of the processing of memory relocation module 131 depicted by FIG. 24 and FIG. 25 will be described. FIG. 28 illustrates a flow of the processing of memory relocation module 131 according to the second embodiment, and FIG. 29-FIG. 35 illustrate the details of some processing of the process in FIG. 28. The memory relocation module 131 according to the second embodiment carries out the processing in FIG. 28 at the time of the end of the job. Or the memory relocation module 131 carries out the processing in FIG. 28 regularly (for example, every ten seconds).

In addition, the example of FIG. 28-FIG. 35 represents an example of the case that the job 1 and the job 2 do not satisfy the NUMA policy among the job 1-the job 3 under the execution. In addition, the example of FIG. 28-FIG. 35 represents the example of a case to select the node "nd" of relocation destination of the memory mm, which the job 1 under the execution in the first node "nd1" uses, among the node "nd2" and the node "nd3".

[Processing of Memory Relocation Module]

FIG. 28 is a diagram of flow chart explaining the details of the processing of memory relocation module 131 according to the second embodiment depicted by FIG. 24 and FIG. 25.

S81: The memory relocation module 131 creates list "JLIST" of jobs that do not satisfy the NUMA policy. The details of the processing of process S81 will be mentioned later in a flow chart of FIG. 29. The list "JLIST" includes a list of identification information of the job "jobid1, jobid2, . . . , jobidx". The list "JLIST" in the embodiment includes the job 1 and the job 2, for example.

S82: The memory relocation module 131 judges whether the list "JLIST" created in process S81 is empty.

S83: When it is not empty (Yes of S82), the memory relocation module 131 repeats the processing of processes S84-S89 for each job in the list "JLIST".

On the other hand, when the list "JLIST" created in process S81 is empty (No of S82), it indicates that all jobs satisfy the NUMA policy. Therefore, the memory relocation module 131 finishes the processing without relocation.

S84: The memory relocation module 131 selects one job from the list "JLIST", extracts the node "nd" which acquires a group of memory pages mp which the job uses and creates the list "NLIST" of the node "nd". The details of the processing of process S84 will be mentioned later in a flow chart of FIG. 30.

In this embodiment, for example, the memory relocation module 131 selects job 1 from the list "JLIST". In addition, the list "NLIST" in the embodiment has the node "nd2" and the node "nd3".

S85: The memory relocation module 131 judges whether the list "NLIST" created in process S84 is empty. In the case of the empty (No of S85), the memory relocation module 131 does not relocate the job which is selected.

S86: When it is not empty (Yes of S85), the memory relocation module 131 calculates evaluation value "eval" indicating the outbreak degree of the slashing when the memory pages mp used by the job "jobid", which is selected from the list "JLIST", is relocated into the node nd in the list "NLIST". In other words, the evaluation value "eval" (judgment value) indicates the influence degree on performance of the execution of the job by the outbreak of the slashing with the relocation.

Therefore, a case that the evaluation value "eval" is smaller indicates that there is a higher possibility degree that the node "nd" of relocation destination acquires memory pages mp corresponding to the group of the index levels which has same as or relative position relations the group of the index levels of the non-use state. Therefore, the memory relocation module 131 detects the node nd where the evaluation value "eval" is smaller as the node "NIDz" nd of relocation destination. The details of the processing of process S86 will be mentioned later in a flow chart of FIG. 31.

The memory relocation module 131 calculates the evaluation value in a case to relocate the memory pages mp which the job 1 uses into the node nd2 and the node nd3, for example. The example indicates that the evaluation value "eval" of a case to relocate it in the node nd3 is smaller.

S87: The memory relocation module 131 detects the job "jobid'" that the evaluation value "eval'" improves by relocating it into the node "NIDj" nd before the relocation of job "jobid" which is selected. The details of the processing of process S87 will be mentioned later in a flow chart of FIG. 32.

In other words, when migrating the job1 to the node nd3, memory pages mp of the non-use state in the node nd1 of the origin of relocation of job 1 increase. Therefore, the memory relocation module 131 detects a job to satisfy the NUMA policy by migrating to the node nd1 of the origin of relocation among the jobs that do not satisfy the NUMA policy. Then the memory relocation module 131 selects the job having a possibility of control the outbreak of the slashing among plural jobs.

In this way, the memory relocation module 131 acquires different group of the index levels of the cache memory corresponding to the address of third plural memory pages mp in the third node nd3 where the data which other jobs (job 2) access were memorized.

The memory relocation module 131 judges whether the first node nd1 has third plural memory pages mp of the non-use state corresponding to the group of the index levels having same as or relative position relation with the different group of the index level. When the first node nd1 has third plural memory pages mp which are non-use state, the memory relocation module 131 moves different data into the third plural memory pages mp.

In this embodiment, for example, the job 2 is detected as the job that the evaluation value becomes small more by relocating it in the node nd1 of the origin of relocation of the job 1. Therefore, it is possible that the memory relocation module 131 detects the job having a possibility of relocation of the memory pages mp into the node nd1 of the origin of relocation while the memory relocation module 131 controls the outbreak of the slashing. In this way, according to the parallel computer nd in the embodiment, in the case of migration of the job based on NUMA policy, it is possible to control the outbreak of the slashing with migration.

S88: When the total "eval+eval'" of the evaluation value in the process S86 and process S87 is smaller than the total of the last evaluation value, the memory relocation module 131 establishes the target job of the relocation and node nd of relocation destination. The details of the processing of process S88 will be mentioned later in a flow chart of FIG. 33. In other words, in the embodiment, the node nd3 is settled as the node nd of the relocation destination of the job 1, and node nd1 is settled as the node nd of the relocation destination of the job 2.

S89: The memory relocation module 131 judges whether all jobs in the list "JLIST" created in process S81 are already selected. When all jobs are not selected (No of S89), the memory relocation module 131 selects a different job in the list "JLIST" and carries out the processing of the processes S84-S89.

In this way, it is possible to detect node nd of relocation destination of the job, which restrains the outbreak of the slashing most when performing the migration of a job under the execution, and the job, which restrains the outbreak of the slashing most when performing the migration to the node nd of origin of relocation of the job concerned. Therefore, it is possible to control the degradation of the job caused by the migration of the job under the execution by purposes such as the NUMA policy.

S90: When all jobs are selected (Yes of S89), the memory relocation module 131 finishes the loop for each job in the list "JLIST".

S91: The memory relocation module 131 carries out the relocation of the job based on information of the job for the relocation and the node nd of relocation destination settled in the process S89. The details of the processing of process S91 will be mentioned later in a flow chart of FIG. 34.

[Process S81 of FIG. 28]

Figure 29:
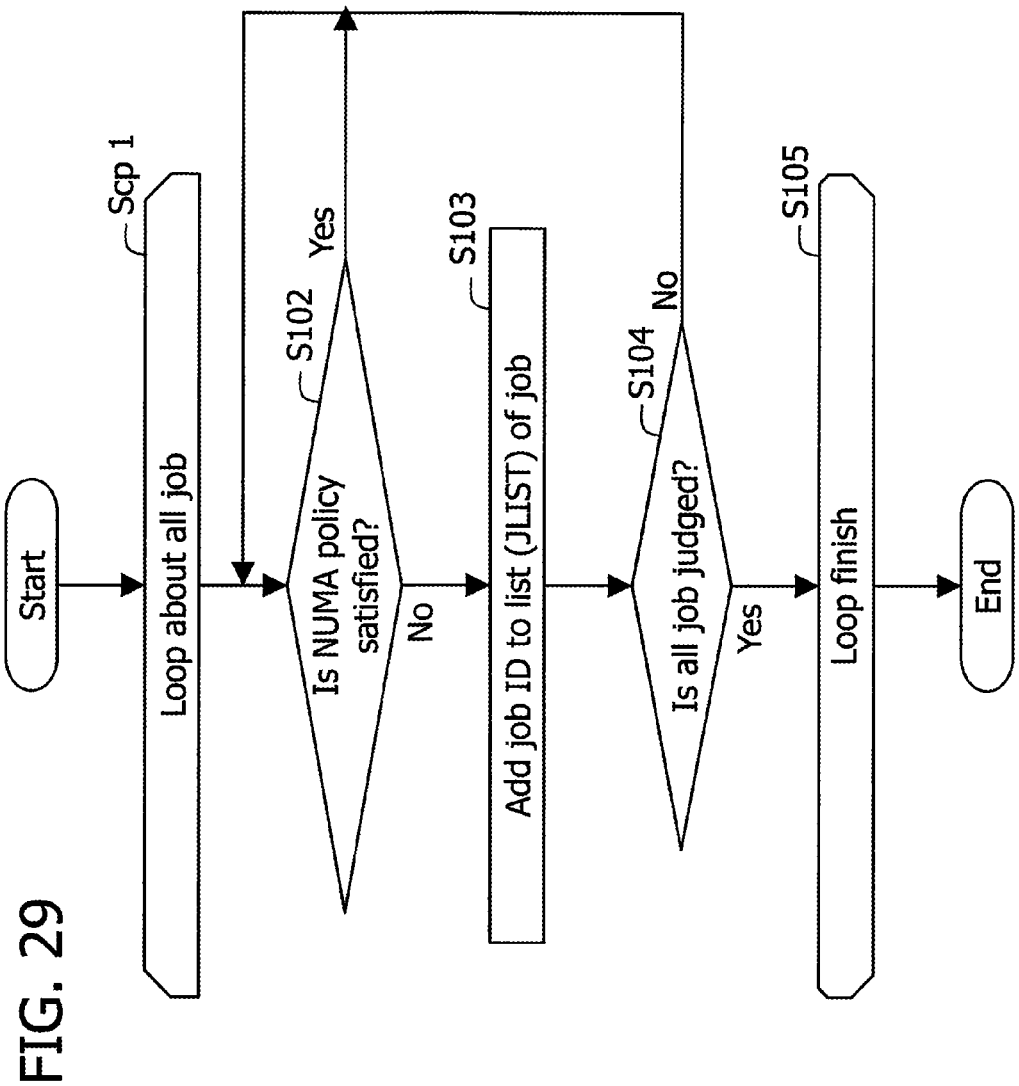
FIG. 29 is a diagram of flow chart explaining the details of the processing of process S81 of FIG. 28.

FIG. 29 is a diagram of flow chart explaining the details of the processing of process S81 of FIG. 28. As illustrated in the flow chart of FIG. 28, the memory relocation module 131 creates the list "JLIST" of the job that do not satisfy the NUMA policy (S81 of FIG. 28). In this embodiment, the memory relocation module 131 adds the job 1-job 3 to the list "JLIST".

S101: The memory relocation module 131 carries out the processing of the process S102-S104 for all the jobs to work in each node of the information system of the NUMA type.

S102: The memory relocation module 131 selects one job, and judges whether the job which is selected satisfies the NUMA policy. The memory relocation module 131 is able to acquire NUMA policy which is appointed to the job under the execution.

S103: When the job does not satisfy the NUMA policy (No of S102), the memory relocation module 131 adds the identification information of the job which is selected to the list "JLIST". On the other hand, when the job satisfies NUMA policy (Yes of S102), the memory relocation module 131 selects a different job and carries out the processing of process S102-S104.

S104: The memory relocation module 131 judges whether all the jobs to work in each node of the information system of the NUMA type are selected and are performed the judgment processing.

S105: When all the jobs selected and are performed the judgment processing (Yes of S104), the memory relocation module 131 finishes the loop end. On the other hand, when there is a job which is not selected (No of S104), the memory relocation module 131 selects a different job and carries out the processing of process S102-S104.

[Process S84 of FIG. 28]

Figure 30:
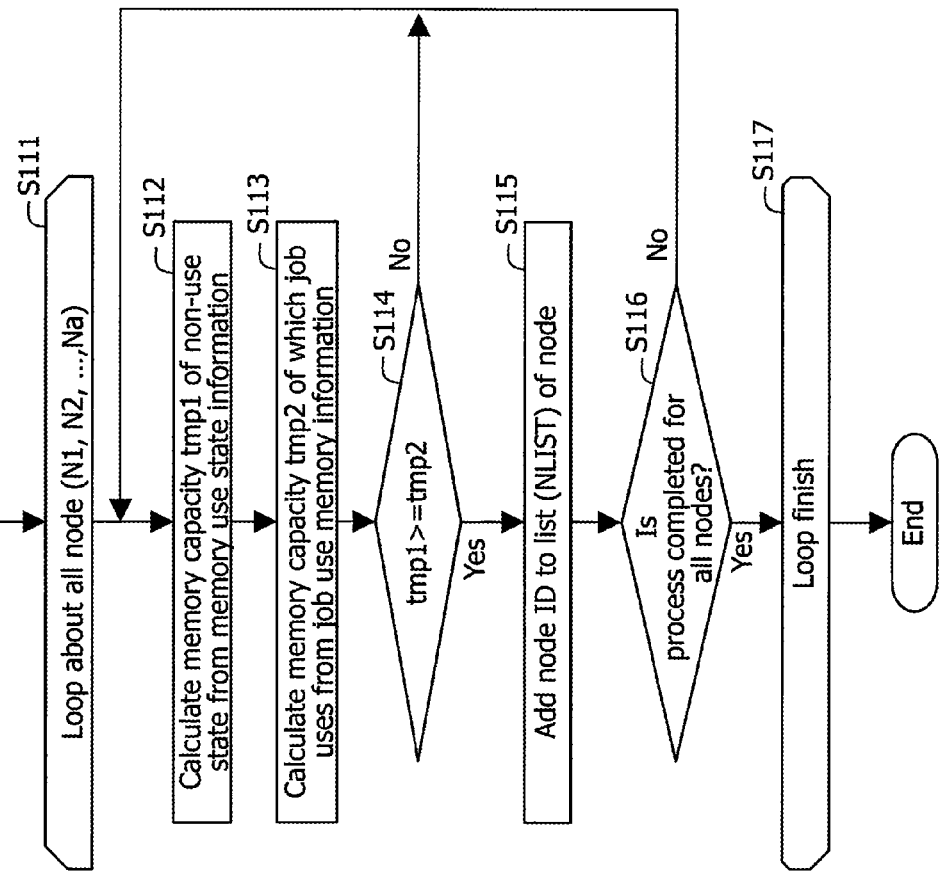
FIG. 30 is a diagram of flow chart explaining the details of the processing of process S84 in FIG. 28.

FIG. 30 is a diagram of flow chart explaining the details of the processing of process S84 in FIG. 28. As mentioned above in the flow chart of FIG. 28, the memory relocation module 131 selects one job from the list "JLIST" and extracts the node having a possibility to acquire the group of the memory pages that the job uses and creates the list "NLIST" of the node (S84 of FIG. 28). In this embodiment, the memory relocation module 131 selects, for example, the job 1 and adds the node nd2 and the node nd3 to the list "NLIST".

S111: The memory relocation module 131 carries out the processing of process S112-S116 for all nodes (nodes "nd2"-"ndx" in FIG. 23).

S112: The memory relocation module 131 refers to the memory use state information 124 (referring to FIG. 27) of the node which is selected and calculates size "tmp1" (size of the space state) of memory pages mp of the non-use state.

S113: The memory relocation module 131 refers to the job use memory information 122 (referring to FIG. 26) of the job which is selected and calculates total size "tmp2" of memory pages mp of which the selected job uses in the node nd before the relocation.

S114: The memory relocation module 131 judges whether the size "tmp2" that calculated in the process S113 is less than the size "tmp1" of empty state in the node nd which is calculated in process S112. When the occupied size "tmp2" is less than size "tmp1" of the empty state (Yes of S114), it indicates that migrating of the selected job to the selected node nd is possible.

S115: When the occupied size "tmp2" is less than the size "tmp1" of a empty state (Yes of S114), the memory relocation module 131 adds the identification information of selected node nd to the list "NLIST".

On the other hand, when the occupied size "tmp2" is bigger than the size "tmp1" of a empty state (No of S114), the memory relocation module 131 selects a different node nd without adding the identification information of selected node nd to the list "NLIST" and carries out the processing of process S112-S114.

S116: The memory relocation module 131 judges whether the process S112-S115 are performed for all node nd.

S117: When completing the processing for all node nd (Yes of S116), the memory relocation module 131 finishes a loop and finishes processing of process S84. On the other hand, when there is a node which is not selected, the memory relocation module 131 selects a different node nd and carries out the processing of process S112-S115.

[Process S86 of FIG. 28]

Figure 31:
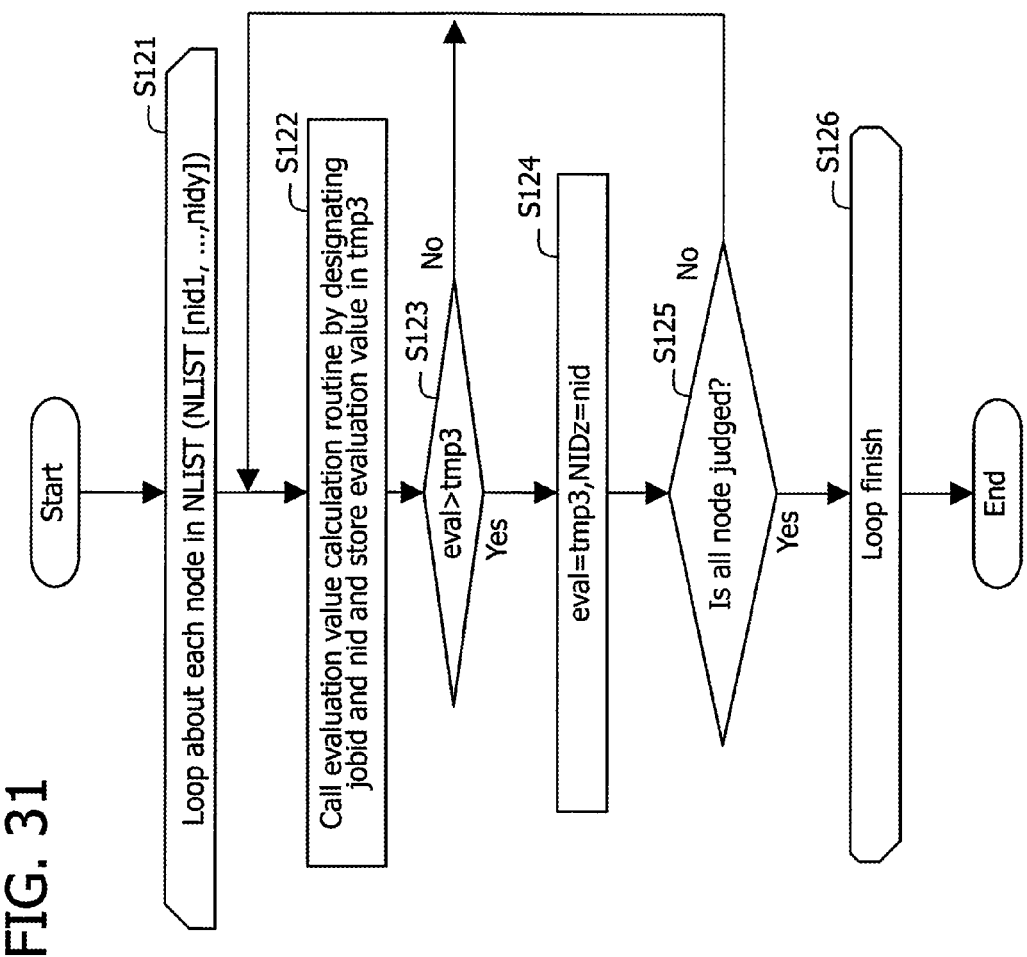
FIG. 31 is a diagram of flow chart explaining the details of the processing of process S86 in FIG. 28.

FIG. 31 is a diagram of flow chart explaining the details of the processing of process S86 in FIG. 28. As mentioned above in the flow chart of FIG. 28, the memory relocation module 131 calculates the evaluation value "eval" when the job "jobid" which is selected from the list "JLIST" is relocated into each node nd in the list "NLIST". In addition, the memory relocation module 131 detects node nd where the evaluation value is smaller as the node "NIDz" nd of the relocation destination (S84 of FIG. 28).

In the embodiment, the memory relocation module 131 calculates each of the evaluation values when relocating the job 1 to the node n2 and node n3. And the memory relocation module 131 detects the node d3 of which the evaluation value is smaller as the node nd of relocation destination.

S121: The memory relocation module 131 carries out the processing of the processes S122-S125 for each node nd in the list "NLIST".

S122: The memory relocation module 131 appoints selected job "jobid" and the node nd selected from the list "NLIST" and calls the evaluation value calculation routine 134.

S123: The memory relocation module 131 judges whether the evaluation value "eval" is larger than the evaluation value "tmp 3" calculated in the process S122.

S124: When the evaluation value "eval" is larger than the evaluation value "tmp 3" (Yes of S123), it indicates that it is possible to acquire the memory pages mp which restrains the outbreak of slashing when relocating the memory pages mp of selected job "jobid" to selected node "nid" nd. Accordingly, the memory relocation module 131 sets the evaluation value "tmp 3" which is calculated new into the variable "eval". Further, the memory allocation module 131 sets selected node [nid] to the node "NIDz" nd of the relocation destination.

On the other hand, when the evaluation value "eval" is less than or equal to the evaluation value "tmp 3" (No of S123), the memory relocation module 131 selects a different node nd from the list "NLIST" and carries out the processing of the process S122 and S123.

S125: The memory relocation module 131 judges whether the process S122-S125 are performed for each node nd in the list "NLIST".

S126: When completing the processing for all node nd, the memory relocation module 131 finishes the loop and finishes the processing of process S84. On the other hand, when there is node nd which is not selected, the memory relocation module 131 selects a different node and carries out the processing of process S122-S125.

[Process S87 of FIG. 28]

Figure 32:
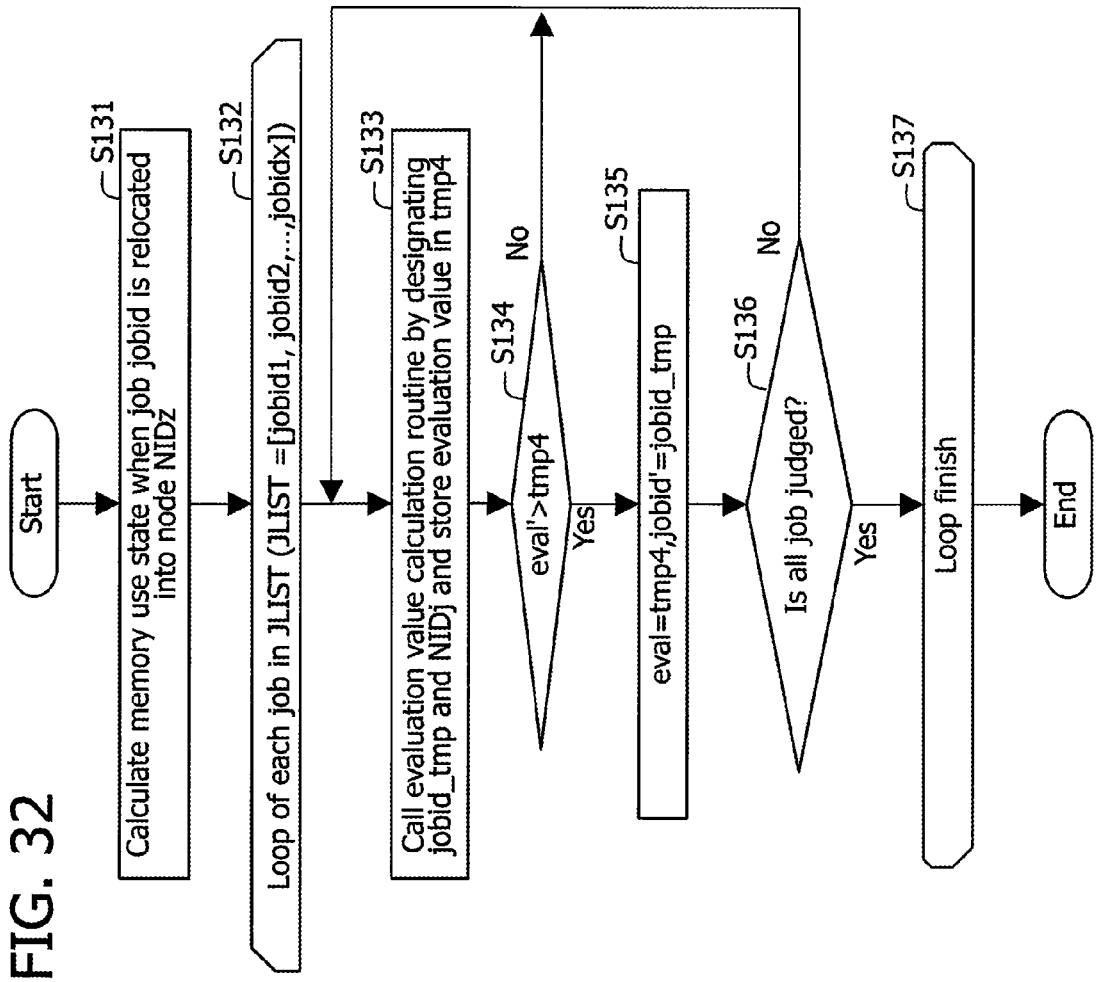
FIG. 32 is a diagram of flow chart explaining the details of the processing of process S87 in FIG. 28.

FIG. 32 is a diagram of flow chart explaining the details of the processing of process S87 in FIG. 28. As mentioned above in a flow chart of FIG. 28, the memory relocation module 131 detects the job "jobid'" which improves the evaluation value "eval'" by migrating to node "NIDj" nd which is an origin node of the relocation of job "jobid" which is selected (S87 of FIG. 28).

As described above, the memory relocation module 131 selects the job 2 that there is less outbreak degree of the slashing when migrating to the node nd1 which is the origin node of the relocation of job 1 among the job 2 and the job 3. For example, the job 2 and job 3 satisfy the NUMA policy by migrating to the job 1.

S131: The memory relocation module 131 calculates the memory use state in the node nd of the origin of relocation when the memory pages mp of job "jobid" which is selected was relocated into the node "NIDz" nd of the relocation destination. The memory relocation module 131 stores the calculated memory use state into the memory use state information 124.

S132: The memory relocation module 131 carries out the processing of process S133-S136 for each job except the job "jobid" in the list "JLIST".

S133: The memory relocation module 131 appoints the job "jobid_tmp" selected from the list "JLIST" and the node "NIDj" of origin node of the relocation based on the memory use state information 124, and calls the evaluation value calculation routine 134. The memory relocation module 131 sets the evaluation value calculated by the evaluation value calculation routine 134 in the value "tmp4". The details of the processing of evaluation value calculation routine 134 will be mentioned later according to FIG. 35.

S134: The memory relocation module 131 judges whether the evaluation value "eval'" which is calculated last time is bigger than the evaluation value "tmp4" which is calculated in the process S133. For example, an initial value of the evaluation value "eval'" which is calculated last time is value "200".

S135: When the evaluation value "tmp4" is bigger than the evaluation value "eval'" (Yes of S134), it indicates that the acquisition of memory pages mp which controls the outbreak of the slashing more is possible in a case of performing the relocation of memory pages mp of job "jobid_tmp" selected in the node "NIDj". Therefore, the memory relocation module 131 sets the evaluation value "tmp4" calculated newly in the variable "eval". In addition, the memory relocation module 131 sets the job "jobid_tmp" which is selected in the job "jobid'" for the new relocation.

On the other hand, when the evaluation value "eval'" is less than or equal to the evaluation value "tmp4" (No of S134), the memory relocation module 131 selects a different job from the list "JLIST" and carries out the processing in the process S133, S134. In this embodiment, the evaluation value "eval'" when the job 2 is migrated to the node nd1 of the origin of relocation is smaller than the evaluation value "eval'" when the job 3 is migrated to the node nd1 of the origin of relocation.

S136: The memory relocation module 131 judges whether the processing of the process S133-S136 are performed for each job except the job "jobid" in the list "JLIST".

S137: When completing the processing for all jobs, the memory relocation module 131 finishes the loop and finishes the processing of process S87. On the other hand, when there is a job which is not selected, the memory relocation module 131 selects a different job and carries out the processing of process S133-S135.

[Process S88 of FIG. 28]

Figure 33:
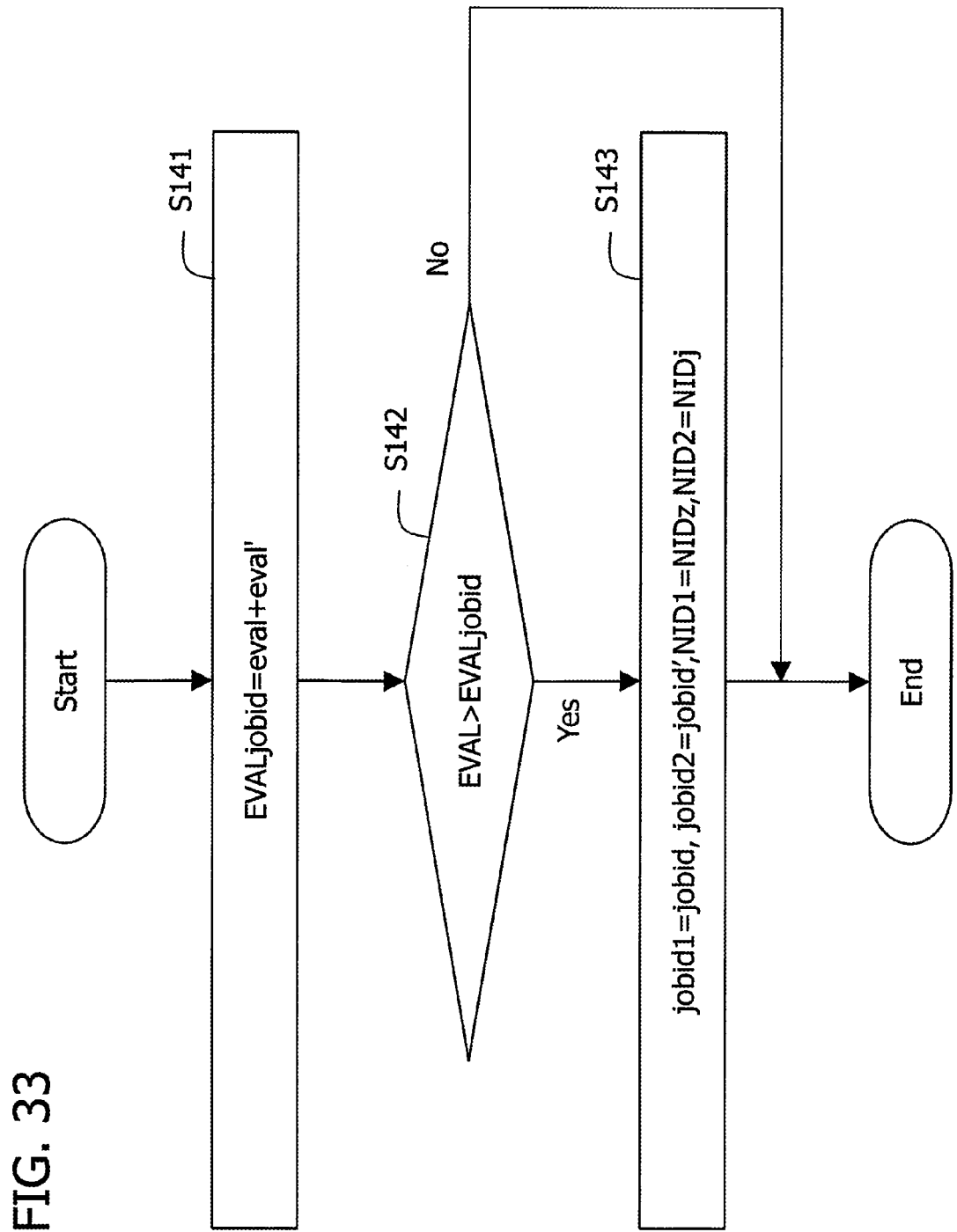
FIG. 33 is a diagram of flow chart explaining the details of the processing of process S88 in FIG. 28.

FIG. 33 is a diagram of flow chart explaining the details of the processing of process S88 in FIG. 28. As mentioned above in the flow chart of FIG. 28, the memory relocation module 131 establishes the job targeted for the relocation and a node of relocation destination (S88 of FIG. 28).

S141: The memory relocation module 131 calculates global assessment level "EVALjobid" by adding the evaluation value "eval" which is calculated according to the flow chart of FIG. 31 to the evaluation value "eval'" which is calculated according to the flow chart of FIG. 32.

S142: The memory relocation module 131 judges whether the global assessment level "EVAL" at last time is bigger than the global assessment level "EVALjobid" which is calculated in the process S141. When the global assessment level "EVAL" at last time is bigger than the global assessment level "EVALjobid" at present time, it indicates that it is possible further suppress the outbreak of the slashing at the time of migration of the job.

S143: When the global assessment level "EVAL" at last time is bigger than the global assessment level "EVALjobid" (Yes of S142), the memory relocation module 131 carries out following process. The memory relocation module 131 sets the job "jobid" (in this example job 1) into the job "jobid1" of the first relocation target and sets the node "NIDz" (in this example node nd3) into the node "NID1" of the relocation destination. The memory relocation module 131 sets the job "jobid'" (in this example job 2) in the job "jobid2" for the second relocation target and sets the node "NIDj" (in this example node nd1) in the node "NID2" of the relocation destination.

On the other hand, when the global assessment level "EVAL" at last time is less than or equal to the global assessment level "EVALjobid" (No of S142), the memory relocation module 131 does not carries out the processing of process S143.

[Process S91 of FIG. 28]

Figure 34:
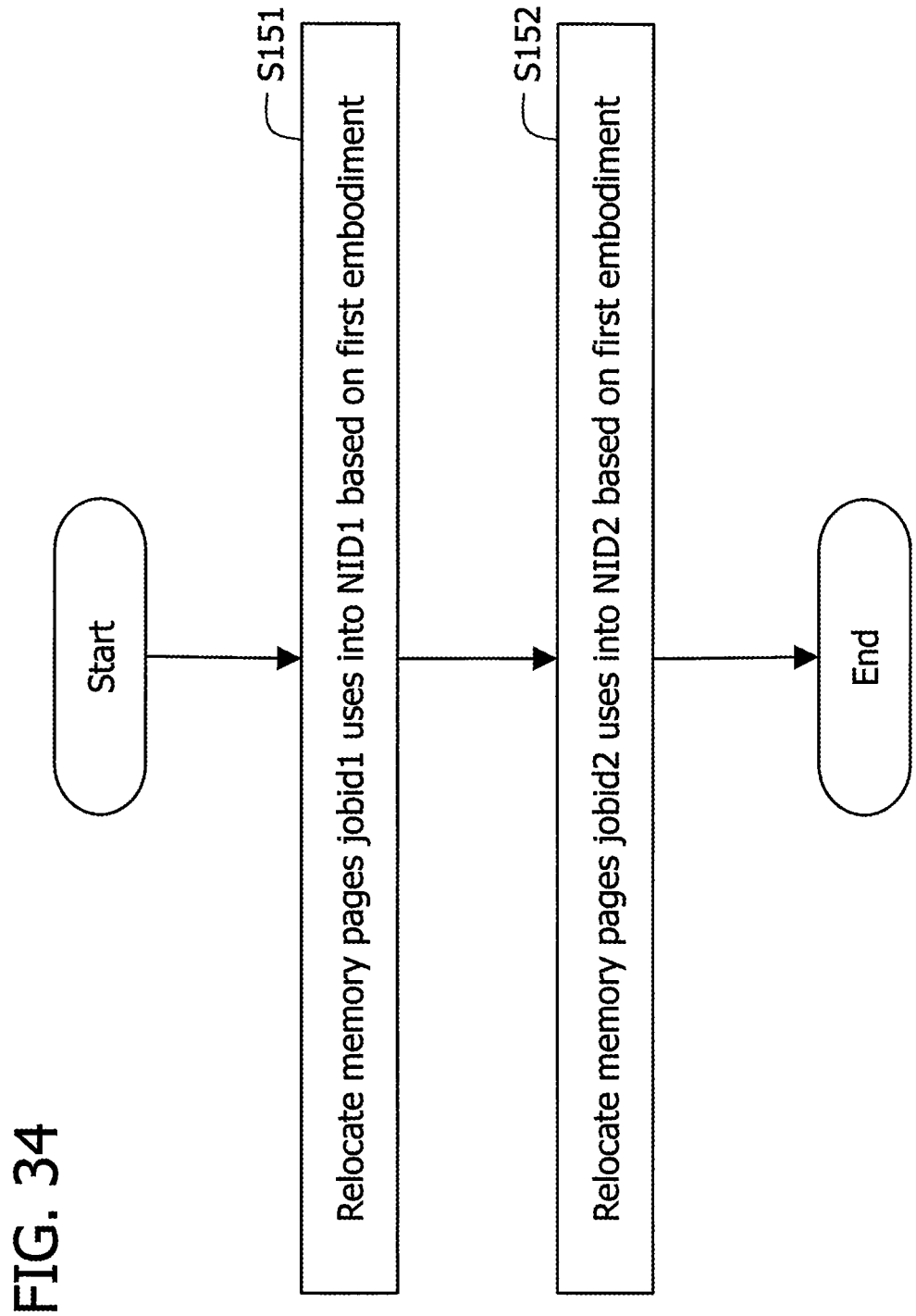
FIG. 34 is a diagram of flow chart explaining the details of the processing of process S91 in FIG. 28.

FIG. 34 is a diagram of flow chart explaining the details of the processing of process S91 in FIG. 28. As mentioned above in the flow chart of FIG. 28, the memory relocation module 131 carries out the relocation of memory pages mp based on the information of the job for the relocation target and the node of the relocation destination (S91 of FIG. 28).

S151: The memory relocation module 131 carries out the processing in the flow chart of FIG. 16 in the first embodiment, and relocates the memory pages that the job "jobid1" for the first relocation target uses into the node "NID1" of relocation destination.

In other words, the memory relocation module 131 acquires memory pages mp of the usable state in the node nd3 corresponding to the group of the index levels having same as or relative position relation with the group of the index levels corresponding to the memory pages mp of which the job 1 uses. In addition, the memory relocation module 131 moves data memorized in the memory pages mp of which the job 1 uses in the memory pages mp in the node nd3 which are acquired.

S152: The memory relocation module 131 carries out the processing in the flow chart of FIG. 16 of the first embodiment, and relocates the memory pages that the job "jobid2" for the second relocation target uses, into the node "NID2" of relocation destination.

In other words, the memory relocation module 131 acquires memory pages mp of the usable state in the node nd1 corresponding to the group of the index levels having same as or relative position relation with the group of the index levels corresponding to the memory pages mp of which the job 2 uses. In addition, the memory relocation module 131 moves data that memorized in the memory pages mp of which the job 2 uses, into the memory pages mp in the node nd1 which is acquired.

[Evaluation Level Calculation Routine]

Figure 35:
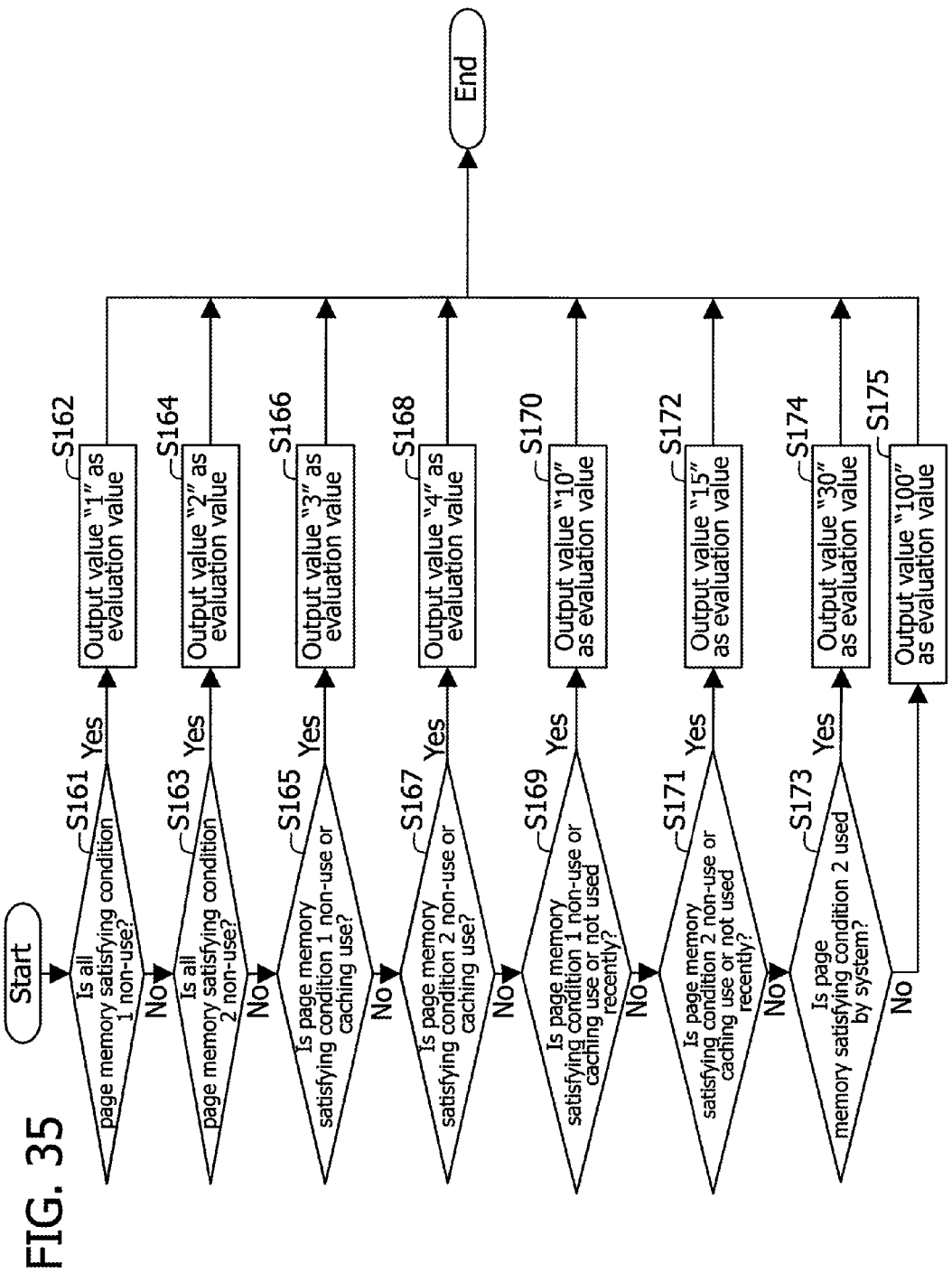
FIG. 35 is a diagram of flow chart explaining the details of the processing of the evaluation value calculation routine 134.

FIG. 35 is a diagram of flow chart explaining the details of the processing of the evaluation value calculation routine 134.

S161: The evaluation value calculation routine 134 judges whether all memory pages mp in the node "nd" for the relocation target corresponding to the index levels satisfying the condition 1 (k=0) (k≠0) are the non-use state. The index levels satisfying the condition 1 is as explained by the first embodiment.

S162: When all memory pages mp are the non-use state (Yes of S161), the evaluation value calculation routine 134 outputs value "1" as the evaluation value.

S163: On the other hand, when all memory pages mp are not the non-use state (No of S161), the evaluation value calculation routine 134 judges whether all memory pages mp satisfying the condition 2 (k=0) (k≠0) are the non-use state. The index levels satisfying the condition 2 is as explained by the first embodiment.

S164: When all memory pages mp are in the non-use state (Yes of S163), the evaluation value calculation routine 134 outputs value "2" as the evaluation value.

S165: When the judgment in the process S163 is No, the evaluation value calculation routine 134 judges whether the memory pages mp satisfying the condition 1 is in the non-use state or the state "used" (caching use of the file) which is temporary use state as a file at one time. For example, the temporary use state indicates a state using memory page mp for the purpose of cache.

S166: When the judgment of process S165 is Yes, the evaluation value calculation routine 134 outputs value "3" as the evaluation value.

S167: When the judgment of process S165 is No, the evaluation value calculation routine 134 judges whether the memory pages mp satisfying the condition 2 is in the non-use state or the state "used" (caching use of the file).

S168: When the judgment of process S167 is Yes, the evaluation value calculation routine 134 outputs value "4" as the evaluation value.

S169: When the judgment of process S167 is No, the evaluation value calculation routine 134 judges whether the memory pages mp satisfying the condition 1 is in the non-use state or the state "used" (caching use of the file) or the state "used" (not used recently).

S170: When the judgment of process S169 is Yes, the evaluation value calculation routine 134 outputs value "10" as the evaluation value.

S171: When the judgment of process S169 is No, the evaluation value calculation routine 134 judges whether the memory pages mp satisfying the condition 2 is in the non-use state or state "used" (caching use of the file) or the state "used" (not used recently).

S172: When the judgment of process S171 is Yes, the evaluation value calculation routine 134 outputs value "15" as the evaluation value.

S173: When the judgment of process S171 is No, the evaluation value calculation routine 134 judges whether the memory pages mp satisfying the condition 2 is the state that the operating system is using or the state described in the process S171.

S174: When the judgment of process S173 is Yes, the evaluation value calculation routine 134 outputs value "30" as the evaluation value.

S175: When the judgment of process S173 is No, the evaluation value calculation routine 134 outputs value "100" as the evaluation value.

In this way, the evaluation value calculation routine 134 calculates a first judgment value (value "1", "2") when the use situation of plural memory pages mp in the candidate node "nd" indicates a non-use state (Yes of S161, Yes of S163). In addition, the evaluation value calculation routine 134 calculates a second judgment value which is bigger than the first judgment value (value "10", "15") when the use situation includes the memory area of the first state indicating the use state which is not accessed during a scheduled period (Yes of S169, Yes of S171).

When the use situation includes memory pages mp of the second state indicating the use at one time (Yes of S165, Yes of S167), the evaluation value calculation routine 134 calculates a third judgment value (value "3", "4") which is smaller than the second judgment value but is larger than the first judgment value. When the use situation includes the memory pages mp of the third state indicating the use with the operation system (Yes of S173), the evaluation value calculation routine 134 calculates a fourth judgment value value "30") which is larger than the second judgment value.

In this way, the evaluation value calculation routine 134 calculates the evaluation value (judgment value) indicating the outbreak degree of the slashing based on a use state of memory pages mp in the node "nd" for the relocation target corresponding to the group of the index levels having same or relative position relations. Thereby, it is possible that the memory relocation module 131 selects the node nd, which restrains the outbreak of the slashing more after the migration, from the plural candidate nodes "nd" based on the evaluation value.

Other Embodiment

In the first and the second embodiments, it is exemplified that the parallel computer "nd" migrates the memory pages mp of which the job under the execution uses into other node "nd". But the relocation processing of memory according to the embodiment is effective about the case to move the memory pages mp, of which the job under the execution in a certain node nd is using, in different memory pages mp of same node "nd".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel computer comprising:
   a first node and a second node, each including:
   a memory having a plurality of memory areas; and
   a cache memory, and
   a processing unit that
   acquires a first group of indexes that identifies cache lines in the cache memory in the first node, the first group of indexes corresponding with addresses of first plurality of memory areas that store data accessed by a job in the first node, when continuing an execution of the job by migrating the job that carried out on the first node to the second node,
   judges whether the second node has a second plurality of memory areas which valid data is not stored in the cache line corresponding to a second group indexes that has same indexes as the first group of indexes that is acquired,
   when the second node has the second plurality of memory areas which valid data is not stored in the cache line corresponding to a second group of indexes that has same indexes as the first group of indexes, relocates the data to the second plurality of memory areas,
   when the second node does not have the second plurality of memory areas which valid data is not stored in the cache line corresponding to a second group of indexes that has same indexes as the first group of indexes, judges whether the second node has a third plurality of memory areas which valid data is not stored in the cache line corresponding to a second group of indexes that has relative position relation with the first group of indexes, and
   when the second node has a third plurality of memory areas which valid data is not stored in the cache line corresponding to a second group of indexes that has relative position relation with the first group of indexes, relocates the data to the second plurality of memory areas.

2. The parallel computer according to claim 1, wherein the second group of indexes having the relative position relation is a group of indexes offset by a constant.

3. The parallel computer according to claim 1, wherein the processing unit carries out the acquisition and the judgment whether the second node has the second plurality of memory areas for a different node from the second node when the second node does not have the second plurality of memory areas.

4. The parallel computer according to claim 1, wherein the processing unit, when there are a plurality of target candidate nodes of migration destination of the job executed by the first node, calculates a value indicating a state of cache contention after the migration based on indication of access of a plurality memory areas in the candidate nodes corresponding to the second group of indexes for each of the plurality of target candidate nodes, and relocates the data to the second plurality of memory areas in the second node that has smallest value among the plurality of target candidate nodes.

5. The parallel computer according to claim 4, wherein the processing unit calculates a first value when the indication of access of the plurality of memory areas in the candidate node indicates a non-use state, and a second value that is larger than the first value when the indication of access of the plurality of memory areas in the candidate node includes memory area that is a first state indicating a use state that is not accessed for a predetermined period.

6. The parallel computer according to claim 5, wherein the processing unit calculates a third value which is smaller than the second value and is larger than the first value when the indication of access of the plurality of memory areas in the candidate node includes memory area that is a second state indicating a temporally use.

7. The parallel computer according to claim 6, wherein the processing unit calculates a fourth value which is larger than the second value when the indication of access of the plurality of memory areas in the candidate node includes memory area that is a third state indicating a use state by an operating system.

8. The parallel computer according to claim 4, the processing unit acquires a third group of indexes of a cache memory corresponding with addresses of third plurality of memory areas that store other data accessed by other job in a third node, judges whether the first node has fourth plurality of memory areas which valid data is not stored in the cache line corresponding to a fourth group of indexes that has same as or relative position relation with the third group of indexes after relocating the data to the second plurality of memory areas, and relocates the other data accessed by the other job to the third plurality of memory areas when the first node has the fourth plurality of memory areas.

9. A non-transitory computer readable storage medium storing therein a program that causes a computer to execute a process, the process comprising:

acquiring a first group of indexes that identifies cache lines in the cache memory in the first node, the first group of indexes corresponding with addresses of first plurality of memory areas that store data accessed by a job in the first node, when continuing an execution of the job by migrating the job that carried out on the first node to the second node;

judging whether the second node has a second plurality of memory areas which valid data is not stored in the cache line corresponding to a second group of indexes that has same indexes as the first group of indexes that is acquired;

when the second node has the second plurality of memory areas which valid data is not stored in the cache line corresponding to a second group of indexes that has same indexes as the first group of indexes, relocating the data to the second plurality of memory areas, when the second node does not have the second plurality of memory areas which valid data is not stored in the cache line corresponding to a second group of indexes that has same indexes as the first group of indexes, judging whether the second node has a third plurality of memory areas which valid data is not stored in the cache line corresponding to a second group of indexes that has relative position relation with the first group of indexes, and when the second node has a third plurality of memory areas which valid data is not stored in the cache line corresponding to a second group of indexes that has relative position relation with the first group of indexes, relocating the data to the second plurality of memory areas.

10. The storage medium according to claim 9, wherein the second group of indexes having the relative position relation is a group of indexes offset by a constant.

11. The storage medium according to claim 9, wherein the acquiring and the judging whether the second node has the second plurality of memory areas comprises acquiring and judging for a different node from the second node when the second node does not have the second plurality of memory areas.

12. The storage medium according to claim 9, wherein the process further comprises:

calculating, when there are a plurality of target candidate nodes of migration destination of the job executed by the first node, a value indicating a slashing a state of cache contention after the migration based on indication of access of a plurality memory areas in the candidate nodes corresponding to the second group of indexes for each of the plurality of target candidate nodes; and relocating the data to the second plurality of memory areas in the second node that has smallest value among the plurality of target candidate nodes.

13. The storage medium according to claim 12, wherein the calculating comprises:

first calculating a first value when the indication of access of the plurality of memory areas in the candidate node indicates a non-use state; and second calculating a second value that is larger than the first value when the indication of access of the plurality of memory areas in the candidate node includes memory area that is a first state indicating a use state that is not accessed for a predetermined period.

14. The storage medium according to claim 13, wherein the calculating further comprises third calculating a third value which is smaller than the second value and is larger than the first value when the indication of access of the plurality of memory areas in the candidate node includes memory area that is a second state indicating a temporally use.

15. A migration method comprising:

acquiring, by a processor, a first group of indexes that identifies cache lines in the cache memory in the first node, the first group of indexes corresponding with addresses of first plurality of memory areas that store data accessed by a job in the first node, when continuing an execution of the job by migrating the job that carried out on the first node to the second node;

judging, by a processor, whether the second node has a second plurality of memory areas which valid data is not stored in the cache line corresponding to a second group of indexes that has same indexes as the first group of indexes that is acquired;

when the second node has the second plurality of memory areas which valid data is not stored in the cache line corresponding to a second group of indexes that has same indexes as the first group of indexes, relocating, by a processor, the data to the second plurality of memory areas, when the second node does not have the second plurality of memory areas which valid data is not stored in the cache line corresponding to a second group of indexes that has same indexes as the first group of indexes, judges, by a processor, whether the second node has a third plurality of memory areas which valid data is not stored in the cache line corresponding to a second group of indexes that has relative position relation with the first group of indexes, and when the second node has a third plurality of memory areas which valid data is not stored in the cache line corresponding to a second group of indexes that has relative position relation with the first group of indexes, relocates, by a processor, the data to the second plurality of memory areas.

16. The migration method according to claim 15, wherein the second group of indexes having the relative position relation is a group of indexes offset by a constant.

17. The migration method according to claim 15, wherein the acquiring and the judging whether the second node has the second plurality of memory areas comprises acquiring and judging for a different node from the second node when the second node does not have the second plurality of memory areas.

18. The migration method according to claim 15, wherein the method further comprises:

calculating, by a processor, when there are a plurality of target candidate nodes of migration destination of the job executed by the first node, a value indicating a state of cache contention after the migration based on state about of a plurality memory areas in the candidate nodes corresponding to the second group of indexes for each of the plurality of target candidate nodes; and wherein the relocating comprises relocating the data to the second plurality of memory areas in the second node that has smallest value among the plurality of target candidate nodes.

19. The migration method according to claim 18, wherein the calculating comprises:

first calculating a first value when the indication of access of the plurality of memory areas in the candidate node indicates a non-use state; and second calculating a second value that is larger than the first value when the indication of access of the plurality of memory areas in the candidate node includes memory area that is a first state indicating a use state that is not accessed for a predetermined period.

20. The migration method according to claim 19, wherein the calculating further comprises third calculating a third value which is smaller than the second value and is larger than the first value when the indication of access of the plurality of memory areas in the candidate node includes memory area that is a second state indicating a temporally use.

\* \* \* \* \*